United States Patent
Macha et al.

(10) Patent No.: US 12,235,852 B2
(45) Date of Patent: Feb. 25, 2025

(54) METADATA-BASED QUERY REWRITING

(71) Applicant: Dell Products L.P., Round Rock, TX (US)

(72) Inventors: Eloy Francisco Macha, Crowley, TX (US); David Edward Frattura, Stamford, CT (US); Robert Anthony Lincourt, Jr., Franklin, MA (US); Stephen James Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/162,364

(22) Filed: Jan. 31, 2023

(65) Prior Publication Data

US 2024/0256553 A1    Aug. 1, 2024

(51) Int. Cl.
*G06F 16/2457*    (2019.01)
*G06F 16/2453*    (2019.01)
*G06F 16/248*     (2019.01)

(52) U.S. Cl.
CPC .. *G06F 16/24573* (2019.01); *G06F 16/24534* (2019.01); *G06F 16/248* (2019.01)

(58) Field of Classification Search
CPC ......... G06F 16/24573; G06F 16/24534; G06F 16/248
See application file for complete search history.

(56) References Cited

U.S. PATENT DOCUMENTS

| | | | |
|---|---|---|---|
| 2005/0038533 A1* | 2/2005 | Farrell | G06F 16/9024 707/E17.011 |
| 2016/0071035 A1* | 3/2016 | Chee | G06Q 10/0635 705/7.28 |
| 2019/0042988 A1* | 2/2019 | Brown | G06F 16/9535 |
| 2020/0074322 A1* | 3/2020 | Chungapalli | G06F 18/29 |
| 2020/0387506 A1* | 12/2020 | Ackermann | G06F 40/247 |
| 2021/0173711 A1* | 6/2021 | Crabtree | G06F 16/9024 |
| 2022/0239661 A1* | 7/2022 | Carver | G06F 11/1471 |

* cited by examiner

*Primary Examiner* — Courtney Harmon
(74) *Attorney, Agent, or Firm* — Chamberlain, Hrdlicka, White, Williams & Aughtry; Aly Dossa

(57) ABSTRACT

A method and system metadata-based query rewriting. Query rewriting may generally refer to the automatic transformation of search queries in order to better represent the intent of the searcher (i.e., reason(s) motivating the searcher to conduct any search query). Embodiments disclosed herein, more specifically, leverage captured asset metadata, for assets hosted across various internal and external data sources, as well as graph techniques, to provide search query results that more closely match the said intent of the searcher. The graph techniques lead to the identification of adjacent areas and topics to the original search query, thereby enhancing the recall and/or precision of any returned search query results.

20 Claims, 22 Drawing Sheets

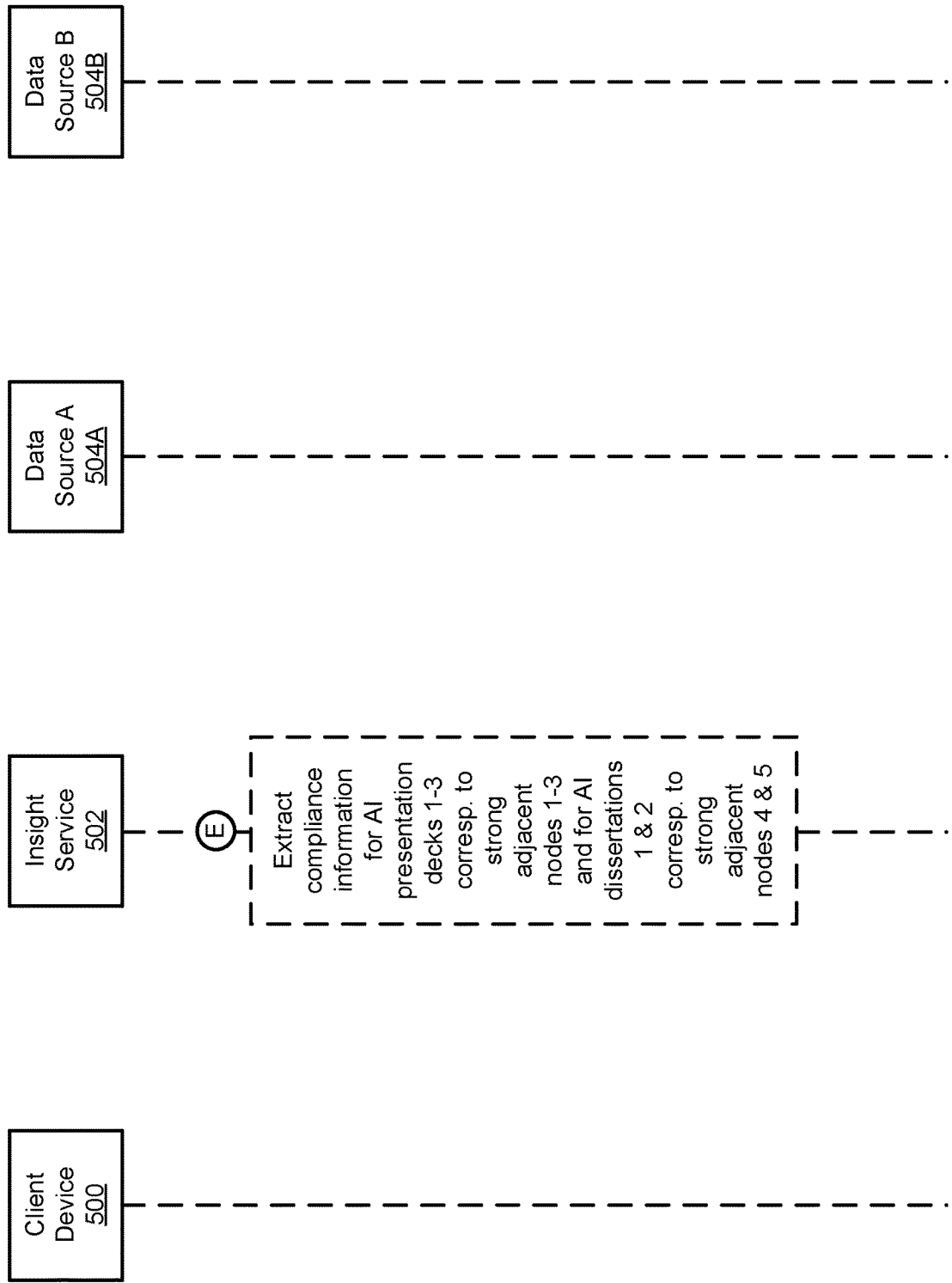

METADATA-BASED QUERY REWRITING

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for processing search queries. The method includes: receiving a search query including at least one search topic; obtaining a metadata graph representative of an asset catalog; filtering, based on the at least one search topic, the metadata graph to identify at least one node subset; generating a k-partite metadata graph using the at least one node subset; and producing a complete search query result based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for processing search queries. The method includes: receiving a search query including at least one search topic; obtaining a metadata graph representative of an asset catalog; filtering, based on the at least one search topic, the metadata graph to identify at least one node subset; generating a k-partite metadata graph using the at least one node subset; and producing a complete search query result based on the k-partite metadata graph.

In general, in one aspect, embodiments disclosed herein relate to a system. The system includes: a client device; and an insight service operatively connected to the client device, and including a computer processor configured to perform a method for processing search queries. The method includes: receiving, from the client device, a search query including at least one search topic; obtaining a metadata graph representative of an asset catalog; filtering, based on the at least one search topic, the metadata graph to identify at least one node subset; generating a k-partite metadata graph using the at least one node subset; and producing a complete search query result based on the k-partite metadata graph.

Other aspects disclosed herein will be apparent from the following description and the appended claims.

BRIEF DESCRIPTION OF DRAWINGS

FIGS. 5A-5L show an example scenario in accordance with one or more embodiments disclosed herein.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5L, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to metadata-based query rewriting. Query rewriting may generally refer to the automatic transformation of search queries in order to better represent the intent of the searcher (i.e., reason(s) motivating the searcher to conduct any search query). Embodiments disclosed herein, more specifically, leverage captured asset metadata, for assets hosted across various internal and external data sources, as well as graph techniques, to provide search query results that more closely match the said intent of the searcher. The graph techniques lead to the identification of adjacent areas and topics to the original search query, thereby enhancing the recall and/or precision of any returned search query results.

Figure 1A:
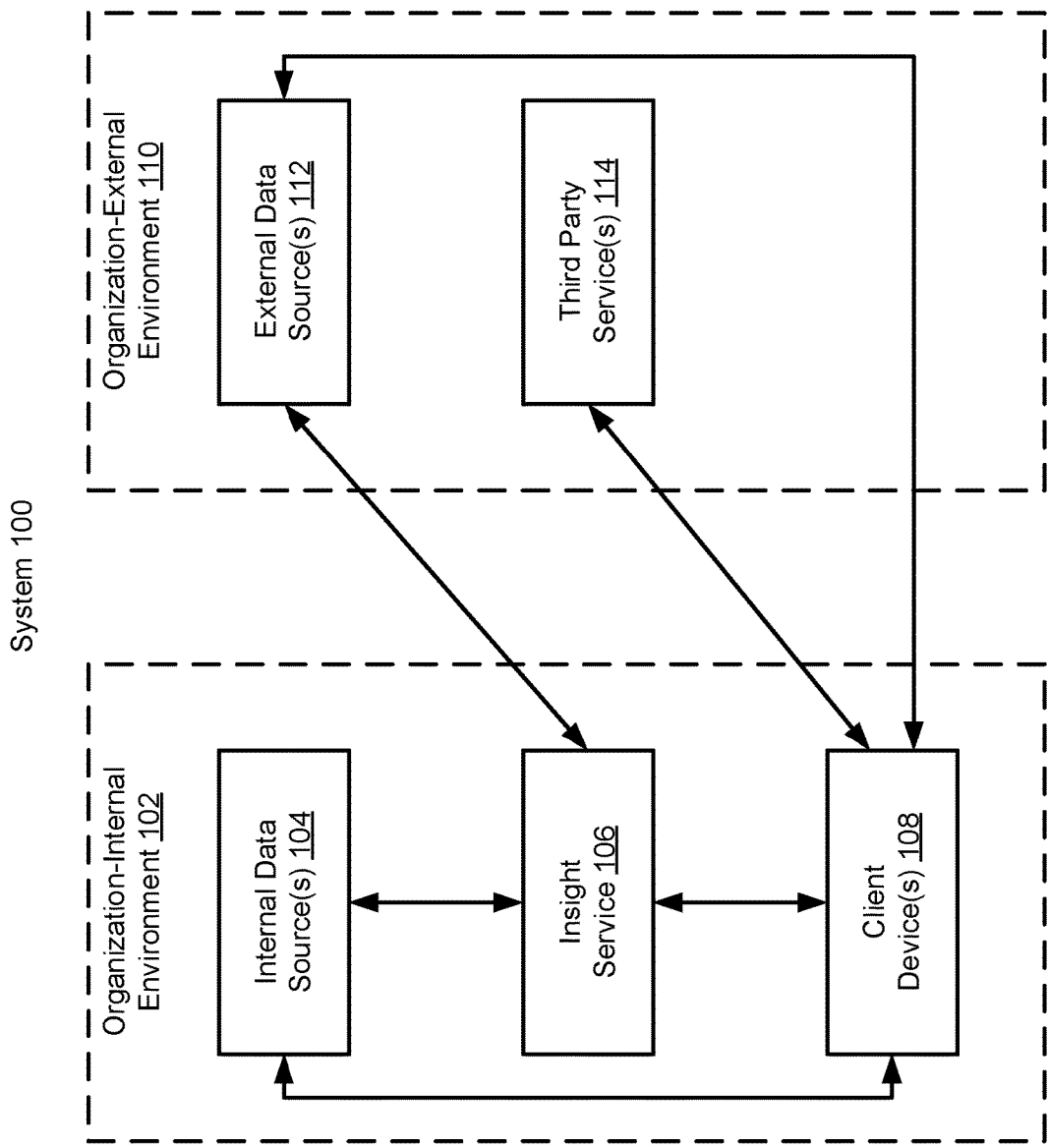
FIG. 1A shows a system in accordance with one or more embodiments disclosed herein.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: metadata-based query rewriting, as described in 3A-3C as well as exemplified in FIGS. 5A-5L, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
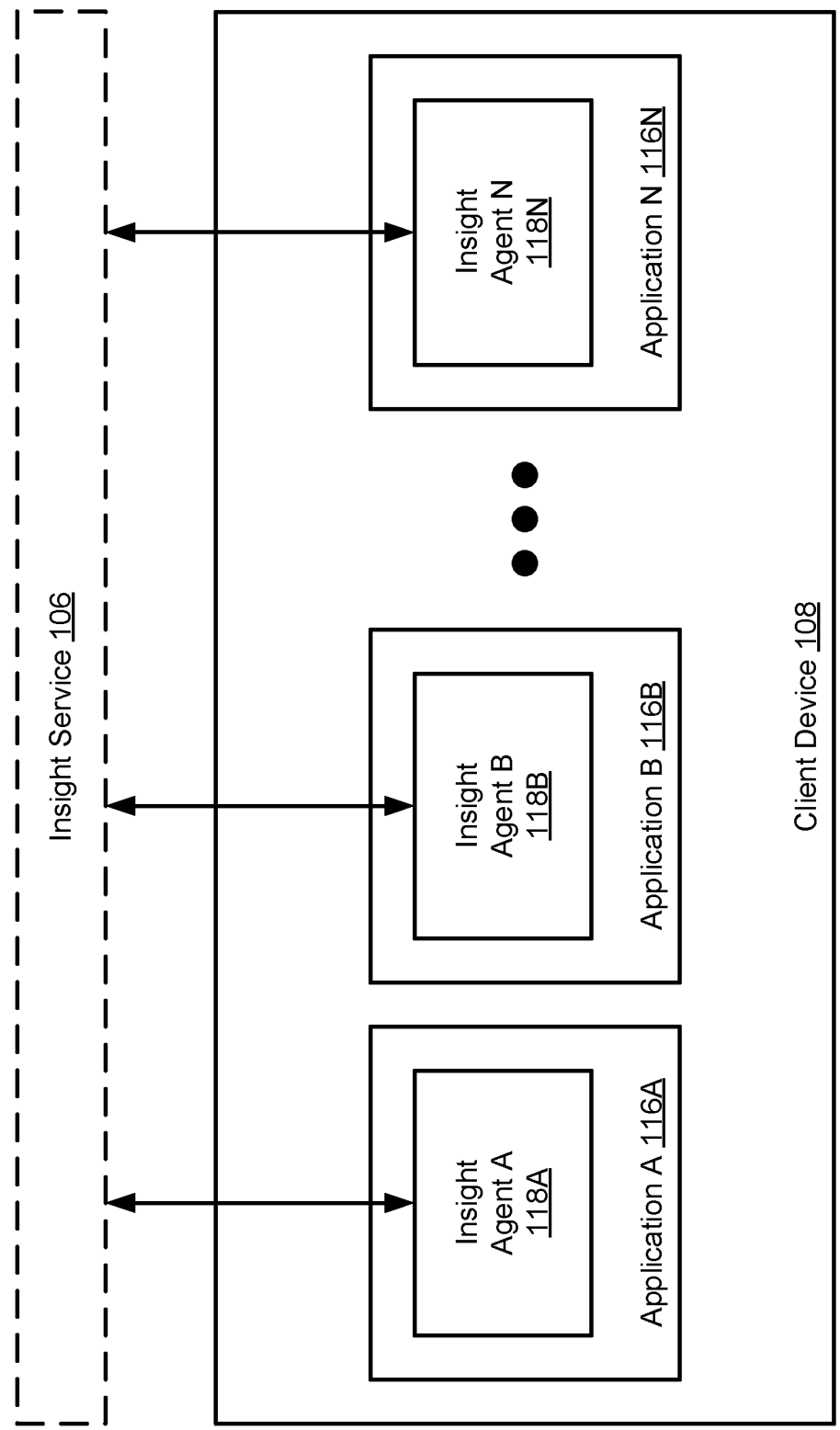
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
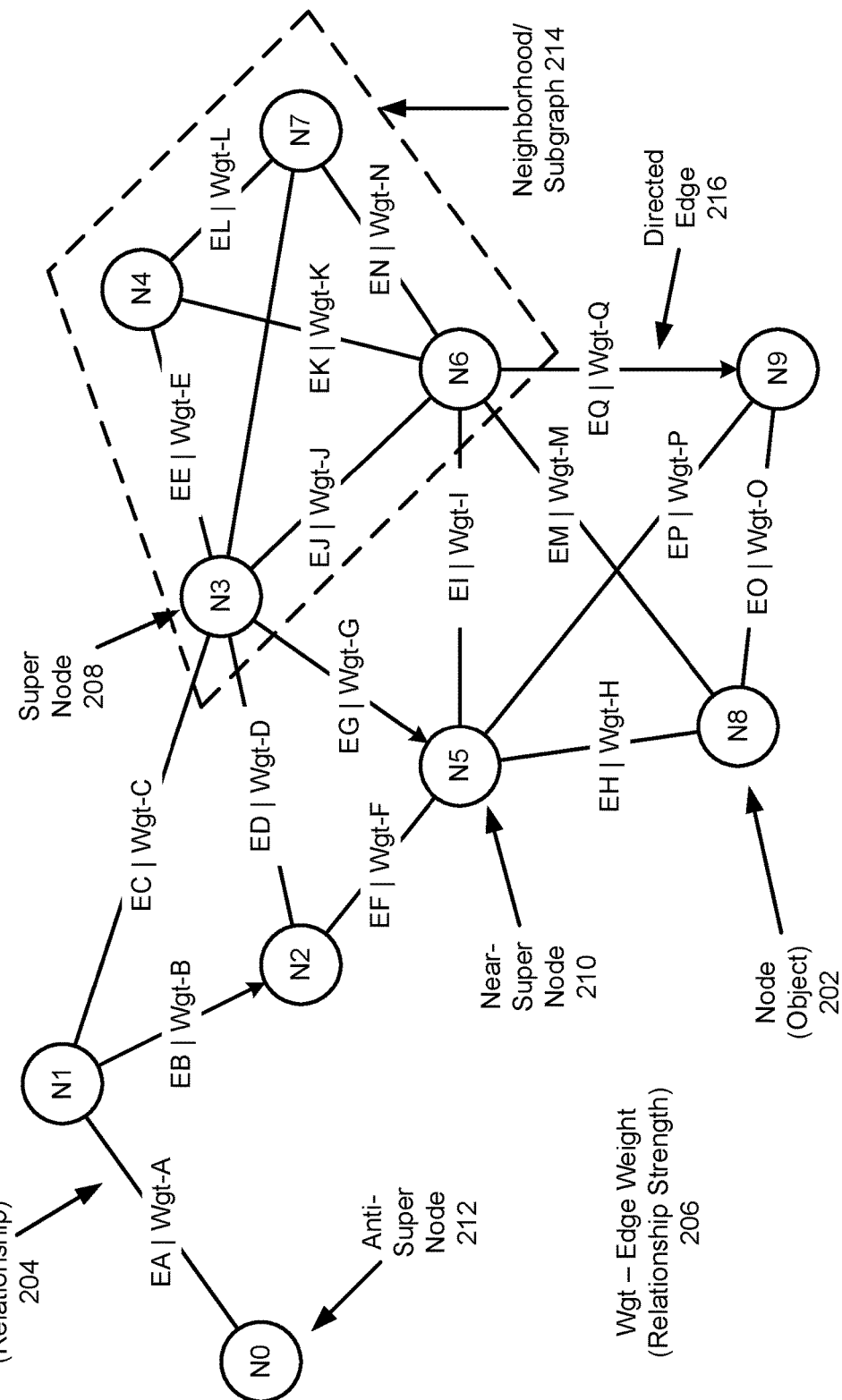
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
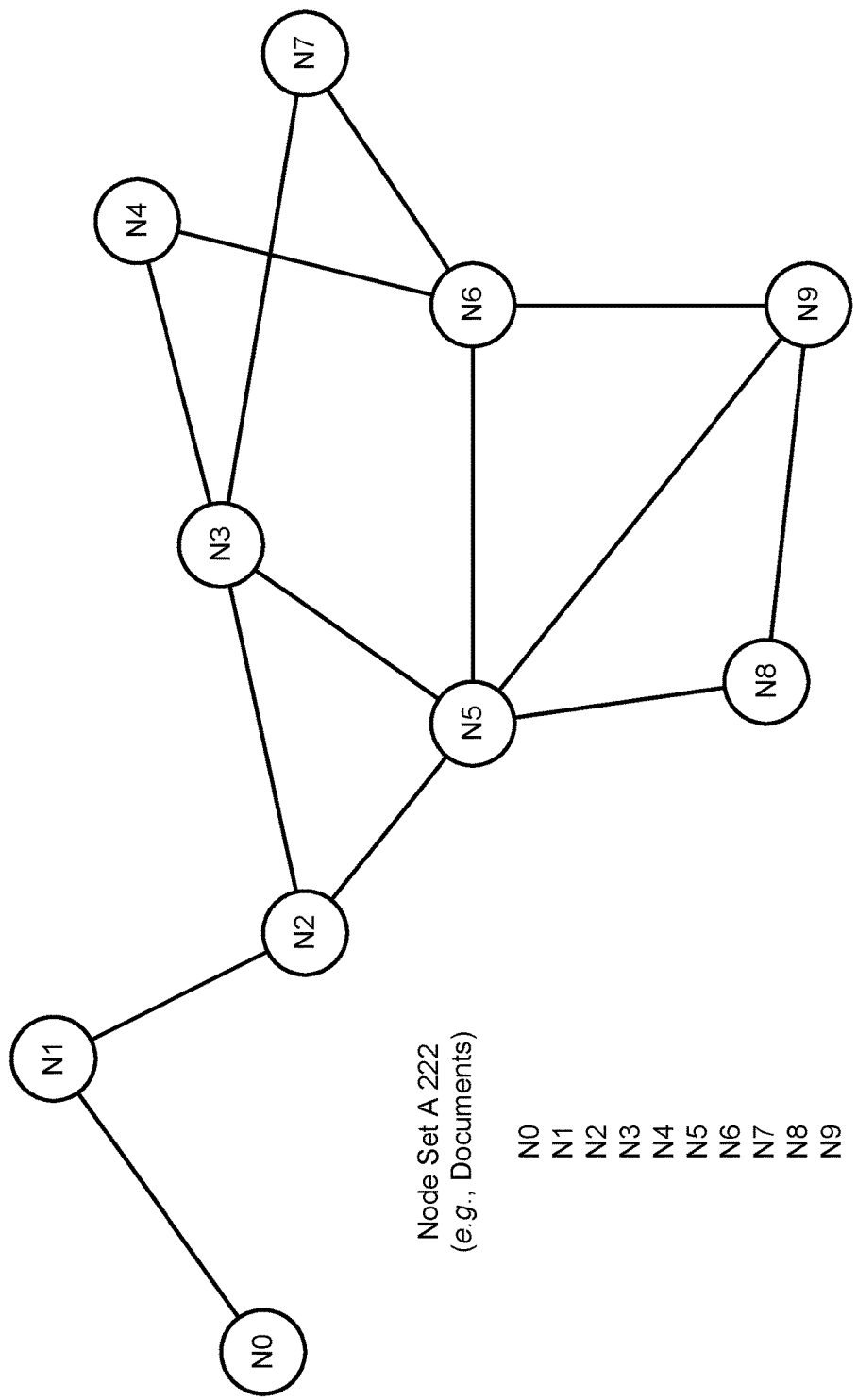
FIGS. 2B-2D show example k-partite connected graphs in accordance with one or more embodiments disclosed herein.
Figure 2C:
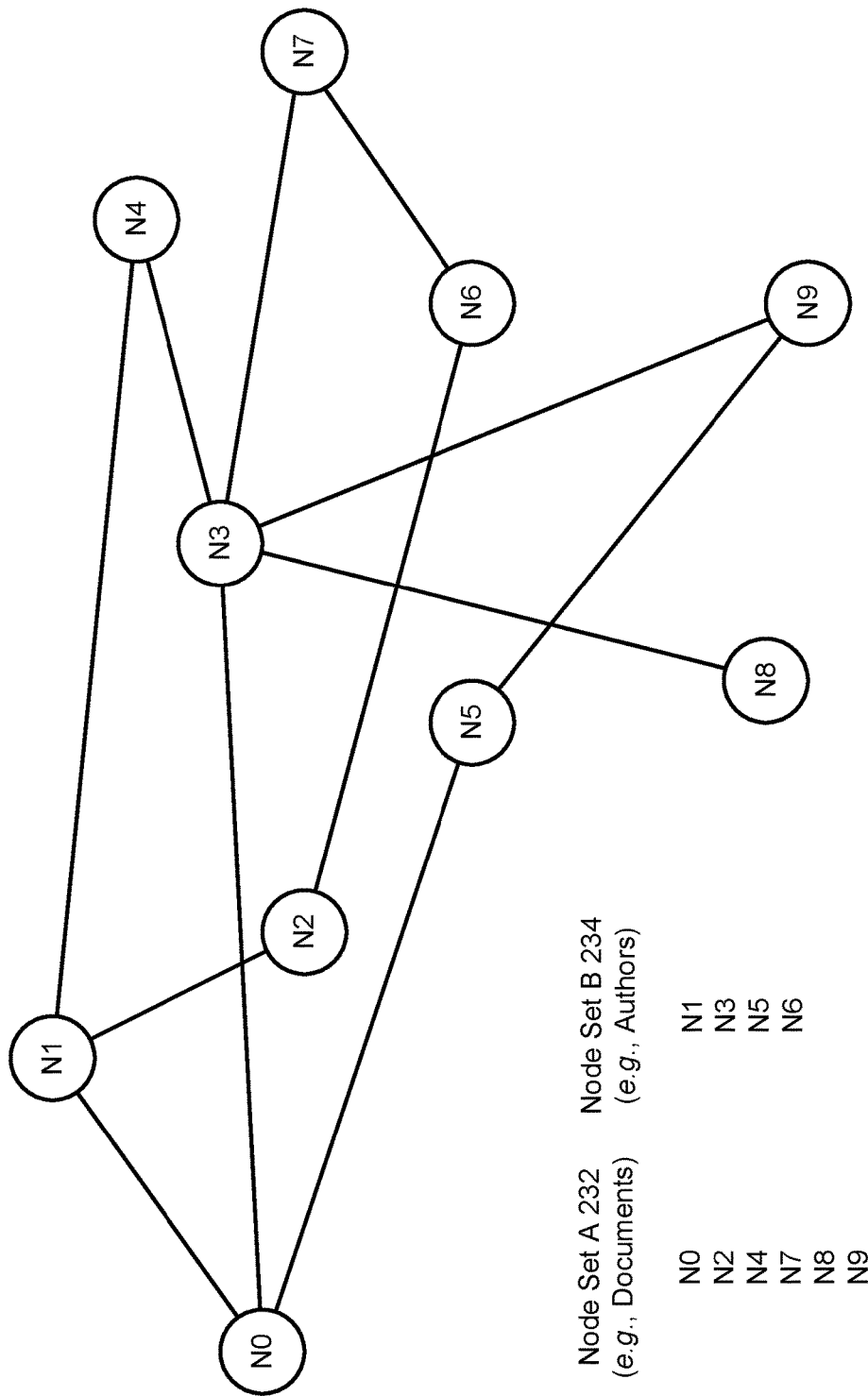
Figure 2D:
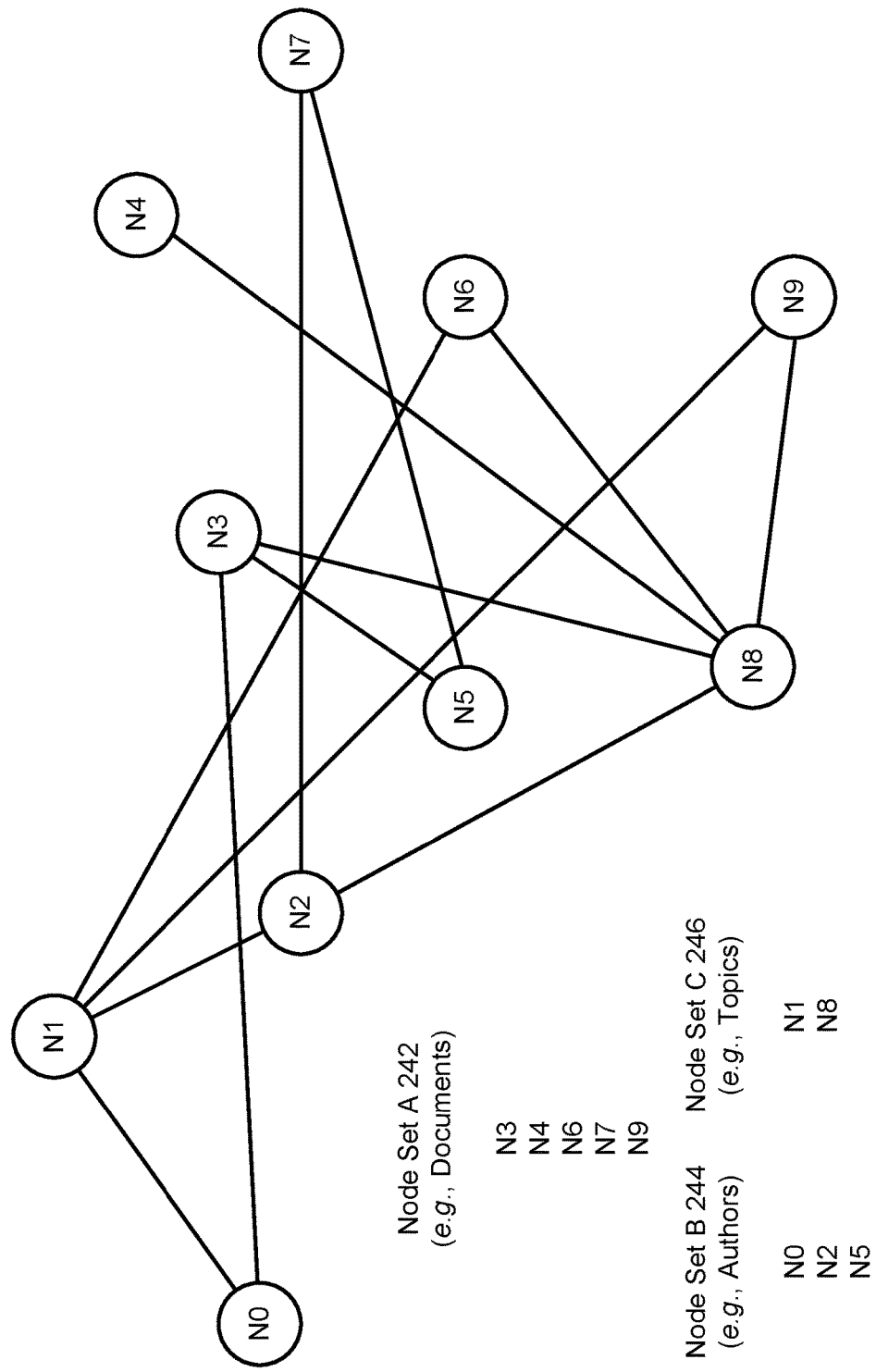

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3A:
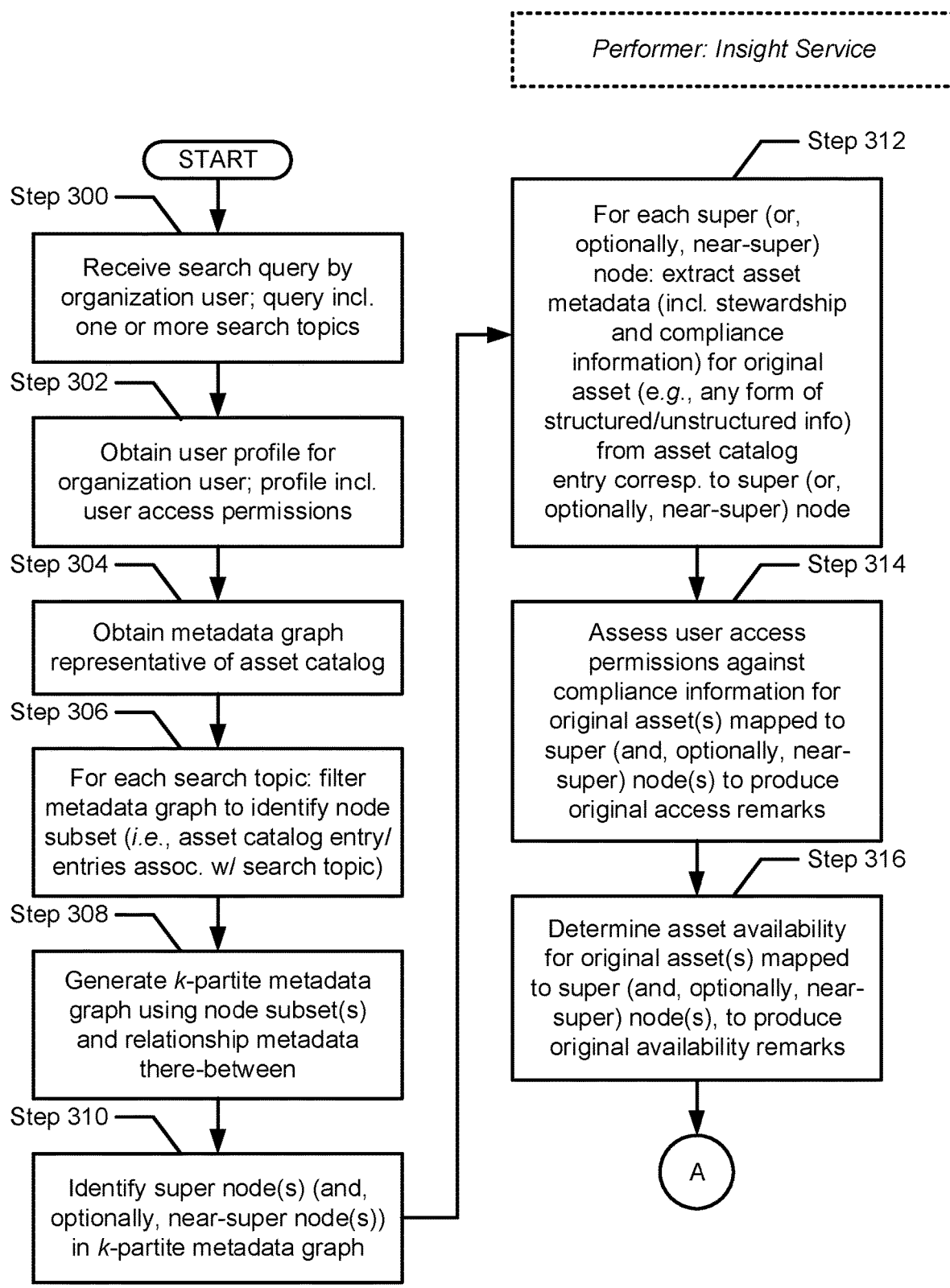
FIGS. 3A-3C show flowcharts describing a method for metadata-based query rewriting in accordance with one or more embodiments disclosed herein.
Figure 3B:
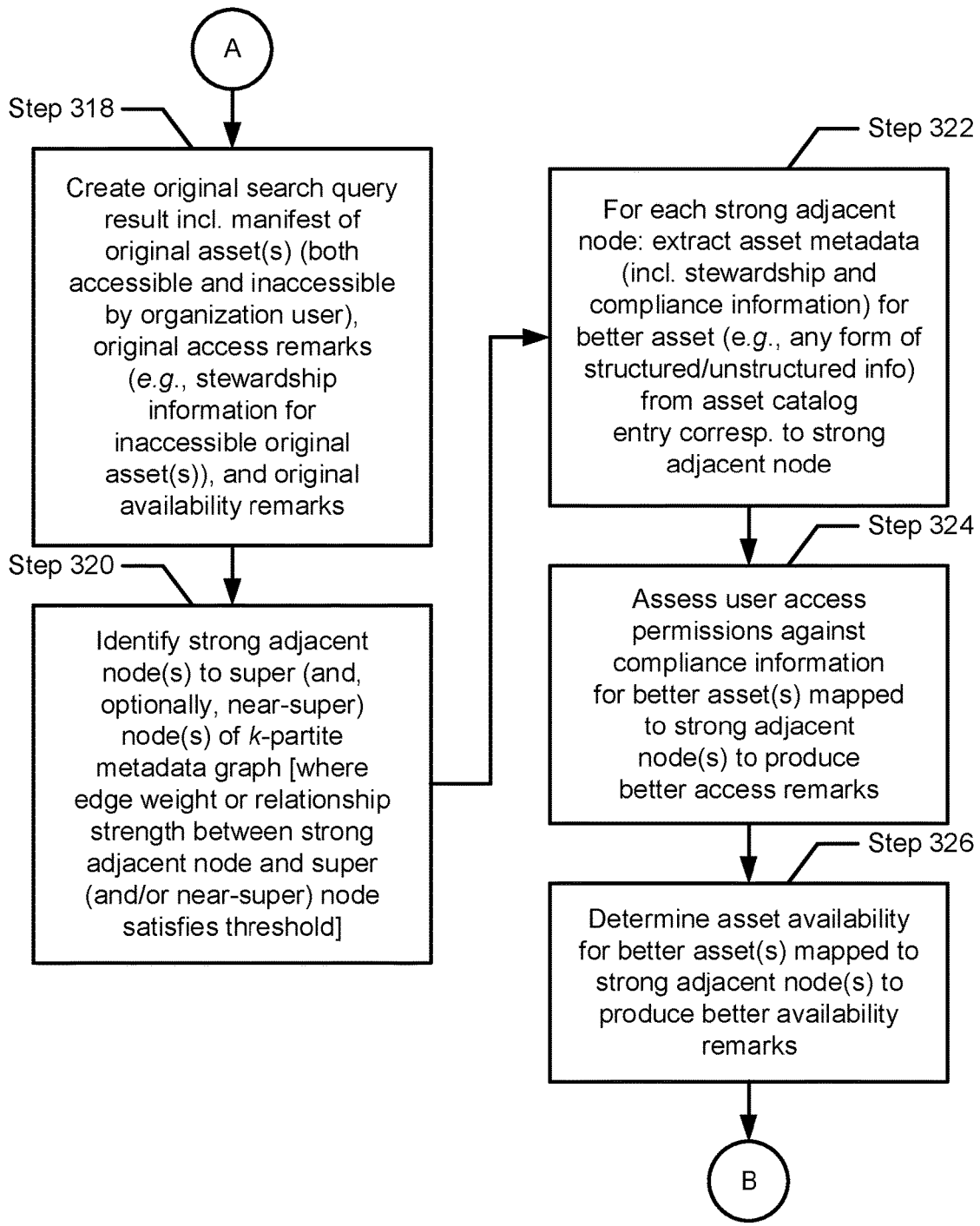
Figure 3C:
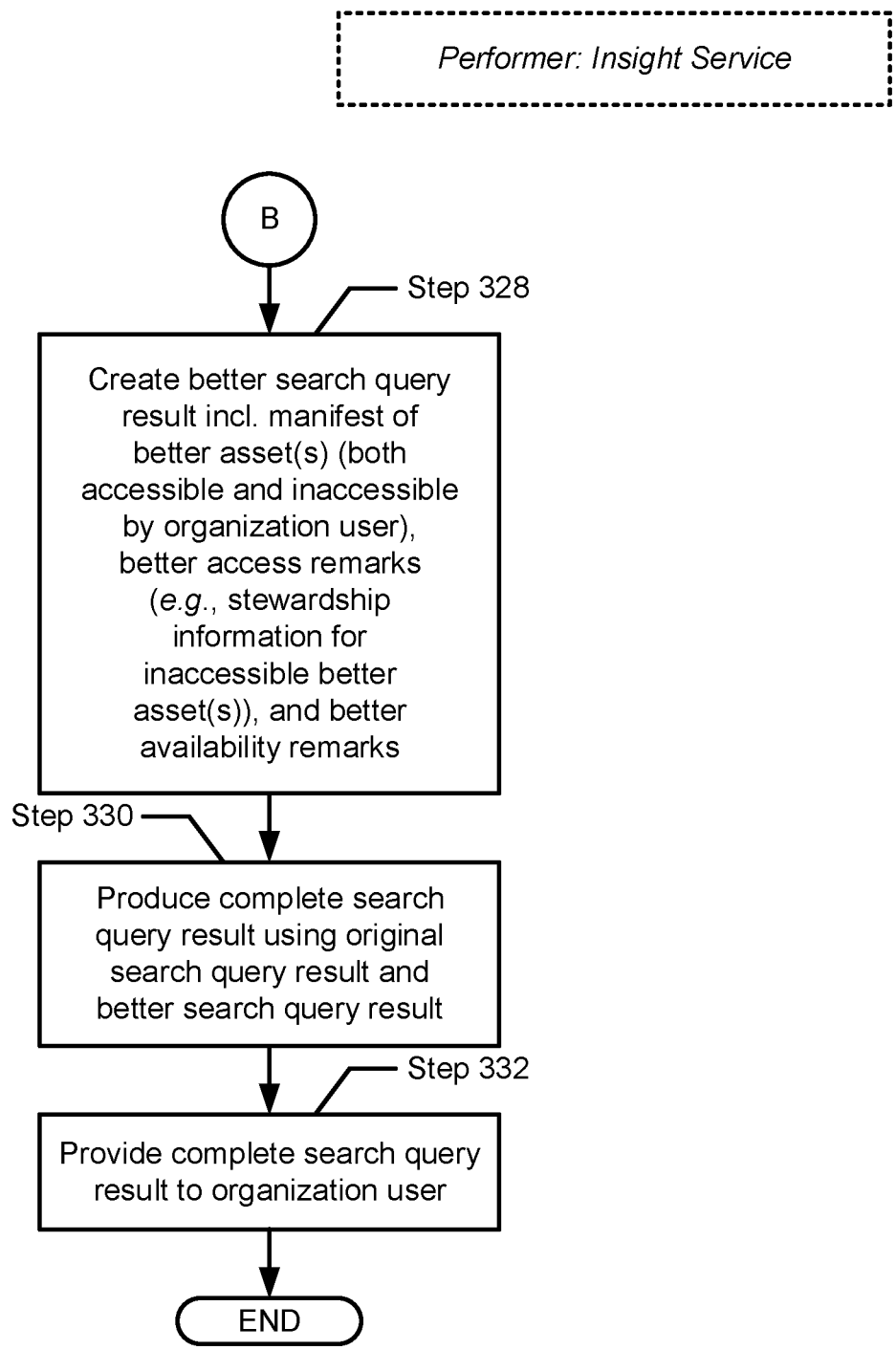

FIGS. 3A-3C show flowcharts describing a method for metadata-based query rewriting in accordance with one or more embodiments disclosed herein. The various steps outlined below may be performed by an insight service (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a search query is received. In one or many embodiment(s) disclosed herein, the search query may include or specify one or more search topics. A search topic may refer to a subject or domain to which sought information may belong or may be associated with. Further, the search query may have been submitted by an organization user. As such, the search query may represent an inquiry, by the organization user, with regards to known or catalogued assets (e.g., any existing forms of structured and/or unstructured information) concerning the specified search topic(s).

In Step 302, a user profile is obtained. In one or many embodiment(s) disclosed herein, the user profile may pertain to the organization user (from which the search query had been received in Step 300). The user profile may refer to a collection of settings and information associated with the organization user. As such, the user profile may include, but is not limited to, user access permissions.

In one or many embodiment(s) disclosed herein, the user access permissions may reflect the level of authorization granted to the organization user for accessing specific resources. The granted level of authorization, for any given organization user, may, for example, be contingent on any number of factors, which may include, but is/are not limited to: one or more user organization roles (e.g., title(s) and/or position(s)) within an organization that may be associated with the given organization user; one or more organization responsibilities (e.g., assigned project(s) or task(s)) within an organization that may be associated with the given organization user; a client device (and the security hygiene or characteristics thereof) operated by the given organization user; and a geographical location where the given organization user may be physically situated. The factor(s) affecting the user access permissions for any given organization user is/are not limited to the aforementioned specific examples.

In Step 304, a metadata graph is obtained. In one or many embodiment(s) disclosed herein, the metadata graph may refer to a connected graph (see e.g., FIG. 2A) representative of an asset catalog. To that end, the metadata graph may include a set of nodes interconnected by a set of edges, where the set of nodes are representative of asset catalog entries and the set of edges are representative of connections or relationships there-between. Further, each node may pertain to a given asset (e.g., any existing structured and/or unstructured form of information), where the representative asset catalog entry thereof may store metadata for, or information descriptive of, the given asset.

Examples of said asset metadata may include, but is not limited to: a brief description of the asset; stewardship (or ownership) information (e.g., individual or group name(s), contact information, etc.) pertaining to the steward(s)/owner(s) of the asset; a version character string reflective of a version or state of the asset at/for a given point-in-time; one or more categories, topics, and/or aspects associated with the asset; an asset identifier uniquely identifying the asset; one or more tags, keywords, or terms further describing the asset; a source identifier and/or location associated with an internal or external data source (see e.g., FIG. 1) where the asset resides or is maintained; and compliance information specifying laws, regulations, and standards surrounding the asset, as well as policies directed to data governance (e.g., availability, usability, integrity, and security) pertinent to the asset. The asset metadata for any asset is not limited to the aforementioned specific examples.

In Step 306, for each search topic of the search topic(s) (received via the search query in Step 300), the metadata graph (obtained in Step 304) is filtered based on the search topic. In one or many embodiment(s) disclosed herein, filtering of the metadata graph may, for example, entail topic matching (e.g., case-insensitive word or phrase matching) between a given search topic and the asset metadata for assets catalogued in the asset catalog entries of which nodes of the metadata graph are representative. Further, for each search topic, the filtering of the metadata graph based thereon may result in the identification of a node subset of the set of nodes forming the metadata graph. The identified node subset, subsequently, may include one or more nodes representative of one or more assets, respectively, that may be associated with the search topic.

In Step 308, a k-partite metadata graph is generated using the node subset(s) (identified in Step 306). In one or many embodiment(s) disclosed herein, the k-partite metadata graph (see e.g., FIGS. 2B-2D) may reflect a new representation of, which may be based on one or more particular perspectives on, the metadata graph (obtained in Step 304). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)—with the exception of uni-(k=1) partite metadata graphs (see e.g., FIG. 2B) where the set of edges interconnect nodes of the single independent set of nodes (or single node subset) forming the uni-partite metadata graphs.

In Step 310, one or more super nodes, in/of the k-partite metadata graph (generated in Step 308), is/are identified. In one or many embodiment(s) disclosed herein, a super node may refer to a densely connected node or a node with a disproportionately high number of edges connected thereto. Additionally, or alternatively, a super node may be identified as any node representing a most connected node (e.g., any node that serves as an endpoint of a pair of endpoints to a highest number of edges) in the k-partite metadata graph, which may otherwise be defined as any node that serves as an endpoint of a pair of endpoints to a number of edges, where the number of edges meets or exceeds a threshold number of edges (that may be dynamically set). For example, the threshold number of edges may be set to ten edges, where any node(s) in the k-partite metadata graph that serves as an endpoint (of a pair of endpoints) to at least ten edges may be classified or labeled as a super node in/of the k-partite metadata graph.

Optionally, one or more near-super nodes, in/of the k-partite metadata graph (generated in Step 308), is/are further identified. In one or many embodiment(s) disclosed herein, a near-super node may refer to any node that nearly satisfies, but still falls short, of the criterion/criteria for being classified or labeled as a super node. Additionally, or alternatively, a near-super node may be identified or defined as any node that serves as an endpoint of a pair of endpoints to a second number of edges, where the second number of edges lies below the above-mentioned threshold number of edges (i.e., serving as the criterion for identifying super nodes), however, meets or exceeds a second threshold number of edges (that may also be dynamically set). For example, the threshold number of edges may be set to ten edges and the second threshold number of edges may be set to seven edges, where any node(s) in the k-partite metadata graph that serves as an endpoint (of a pair of endpoints) to at least seven edges, but no more than nine edges, may be classified or labeled as a near-super node.

In Step 312, for each super node of the super node(s) (identified in Step 310), and/or for each near-super node of the near-super node(s) (optionally identified in Step 310), at least a portion of asset metadata, for an original asset (e.g., any existing structured and/or unstructured form of information) corresponding to the super node, and/or near-super node, is extracted. In one or many embodiment(s) disclosed herein, the extracted portion of asset metadata may include, but is not limited to, stewardship (or ownership) information and compliance information (both briefly defined above— see e.g., Step 304) associated with the original asset.

In one or many embodiment(s) disclosed herein, any identified super node(s) and/or near-super node(s) may represent asset metadata, describing one or more assets, that may exemplify returned query result(s) that is/are relevant to the search query (received in Step 300) or, more specifically, to the original search query token(s)/phrase(s) (i.e., search topic(s)) posed therein. Accordingly, said asset(s) is/are also referred to herein as original asset(s). Similarly, any access remarks, any availability remarks, and any search query result associated with any original asset(s) may also be referred to herein as original access remarks, original availability remarks, and an/the original search query result.

In Step 314, the user access permissions (obtained in Step 302), associated with the organization user, is assessed against the compliance information (extracted in Step 312) associated with one or more original assets. In one or many embodiment(s) disclosed herein, the original asset(s) may map to asset catalog entry/entries represented by the super node(s) (and/or, optionally, the near-super node(s)) (identified in Step 310).

Further, assessment of the user access permissions, against the asset compliance information, may, for example, entail determining: whether a geographical location of the organization user is within the geographical restrictions or boundaries, at least in part, defining access to an original asset; whether the organization, with which the organization user is associated, is of a particular type (e.g., a commercial business, an educational institution, etc.) to which access and usability of an original asset is granted; and whether one or more organization roles (e.g., title(s) and/or position(s)) and/or professional affiliation(s) (e.g., membership(s) to professional organization(s)), with which the organization user is associated, satisfies criteria for permitting access to an original asset.

Moreover, the above-mentioned assessment, between the user access permissions and the asset compliance information, may result in producing original access remarks that concern the original asset(s) associated with the extracted compliance information. In one or many embodiment(s) disclosed herein, any original access remarks may refer to information expressing whether the original asset(s) is/are accessible or inaccessible to/by the organization user. Said information (for any given original asset) may include, but is not limited to: an accessibility statement indicating that the given original asset can or cannot be accessed by the organization user; one or more reasons explaining or supporting the accessibility statement; a digital reference link (e.g., uniform resource locator or hyperlink) or an access protocol through which the organization user can access the given original asset should the accessibility statement indicate that the given original asset can be accessed by the organization user; and/or the stewardship information (extracted in Step 312) associated with the given original asset should the accessibility statement alternatively indicate that the given original asset cannot be accessed by the organization user.

In one or many embodiment(s) disclosed herein, stewardship information may be integrated, as part of the original access remarks for a given original asset (if applicable—e.g., if the given original asset is deemed inaccessible), in order to provide the organization user with an opportunity to potentially gain access to the given original asset through communications with the steward(s) or owner(s) of the given original asset. The potential to gain access to the given original asset through this avenue, however, may be moot or disregarded in view of other, higher-tiered compliance policies such as those outlined by geographical restrictions, as well as national and/or international laws, regulations, and standards.

In Step 316, an asset availability, for each of one or more original assets (e.g., any existing structured and/or unstructured form(s) of information), is determined. In one or many embodiment(s) disclosed herein, the original asset(s) may map to asset catalog entry/entries represented by the super node(s) (and/or, optionally, the near-super node(s)) (identified in Step 310). Further, the determination of asset availability for any given original asset may, for example, entail the submission of an asset availability query to an appropriate (i.e., internal or external) data source identified in the asset metadata describing the given original asset. Any asset availability query may include or specify an asset identifier (also found in the asset metadata) that uniquely identifies the given original asset. Moreover, in response to any asset availability query, a corresponding asset availability reply may be received, which may include or specify an asset availability state indicating whether the given original asset is available (e.g., obtainable, usable, or reachable) or unavailable (e.g., unobtainable, unusable, or unreachable). Thereafter, the returned asset availability state(s) for the original asset(s), respectively, may be used to produce original availability remarks concerning the original asset(s). Any original availability remarks may refer to information expressing whether the original asset(s) is/are available or unavailable at/on one or more data sources that the original asset(s) currently reside, or at one time, had resided.

Turning to FIG. 3B, in Step 318, an original search query result is created. In one or many embodiment(s) disclosed herein, the original search query result may include or specify a manifest of the original asset(s) mapped to asset catalog entry/entries represented by the super node(s) (and/or, optionally, the near-super node(s)) (identified in Step 310), the original access remarks (produced in Step 314), and the original availability remarks (produced in Step 316).

In Step 320, for each super node of the super node(s) (identified in Step 310), and/or for each near-super node of the near-super node(s) (optionally identified in Step 310), one or more strong adjacent nodes, which may be found in the k-partite metadata graph (generated in Step 308), is/are identified. In one or many embodiment(s) disclosed herein, with respect to a given super node (and/or, optionally, a given near-super node), a strong adjacent node linked to the given super node (and/or, optionally, the given near-super node) may refer to a node connected thereto via an edge representative of a strong relationship there-between. Quantification of said strong relationship may, for example, entail an edge weight assigned to the edge interconnecting the given super node (and/or, optionally, the given near-super node) and the strong adjacent node, where the edge weight (e.g., expressed as a numerical value) meets or exceeds an edge weight threshold. The edge weight threshold, in turn, may be dynamically set and may denote the criterion for determining whether the associated edge is reflective of a strong relationship between a pair of assets (e.g., pair of any existing structure or unstructured forms of information) corresponding to the given super node (and/or, optionally, the given near-super node) and a strong adjacent node.

In Step 322, for each strong adjacent node of the strong adjacent node(s) (identified in Step 320), at least a portion of asset metadata, for an better asset (e.g., any existing structured and/or unstructured form of information) corresponding to the strong adjacent node, is extracted. In one or many embodiment(s) disclosed herein, the extracted portion of asset metadata may include, but is not limited to, stewardship (or ownership) information and compliance information (both briefly defined above—see e.g., Step 304) associated with the better asset.

In one or many embodiment(s) disclosed herein, any identified strong adjacent node(s) may represent asset metadata, describing one or more assets, that better exemplify/exemplifies the search intent of the organization user. Accordingly, said asset(s) is/are also referred to herein as better asset(s). Similarly, any access remarks, any availability remarks, and any search query result associated with any better asset(s) may also be referred to herein as better access remarks, better availability remarks, and a/the better search query result.

Further, betterment of any said search intent may, for example, entail increasing a recall and/or a precision of the returned query result(s). By increasing recall, a larger set of relevant query result(s) may be returned, whereas a reduction in a number of irrelevant query result(s) being returned may take effect by increasing precision. Increased recall may be brought about through query expansion (e.g., broadening of the search query via the addition of one or more tokens/phrases related to the original search query token(s)/phrase(s) (i.e., search topic(s))) and/or through query relaxation (e.g., narrowing of the search query via the removal of one or more tokens/phrases unrelated to the original search query token(s)/phrase(s)). Meanwhile, increased precision may be brought about through query segmentation (e.g., division of the original search query token(s)/phrase(s) into semantic units also referred to as search query segments) and/or through query scoping (e.g., matching of each search query segment to an intended asset attribute). As disclosed herein, identification of any better asset(s), through the identification of any strong adjacent node(s), and through one or more existing graph techniques, may be equivalent to performing any combination of query expansion, query relaxation, query segmentation, and/or query scoping.

In Step 324, the user access permissions (obtained in Step 302), associated with the organization user, is assessed against the compliance information (extracted in Step 322) associated with one or more better assets. In one or many embodiment(s) disclosed herein, the better asset(s) may map to asset catalog entry/entries represented by the strong adjacent node(s) (identified in Step 320).

Further, assessment of the user access permissions, against the asset compliance information, may, for example, entail determining: whether a geographical location of the organization user is within the geographical restrictions or boundaries, at least in part, defining access to an better asset; whether the organization, with which the organization user is associated, is of a particular type (e.g., a commercial business, an educational institution, etc.) to which access and usability of an better asset is granted; and whether one or more organization roles (e.g., title(s) and/or position(s)) and/or professional affiliation(s) (e.g., membership(s) to professional organization(s)), with which the organization user is associated, satisfies criteria for permitting access to an better asset.

Moreover, the above-mentioned assessment, between the user access permissions and the asset compliance information, may result in producing better access remarks that concern the better asset(s) associated with the extracted compliance information. In one or many embodiment(s) disclosed herein, any better access remarks may refer to information expressing whether the better asset(s) is/are accessible or inaccessible to/by the organization user. Said information (for any given better asset) may include, but is not limited to: an accessibility statement indicating that the given better asset can or cannot be accessed by the organization user; one or more reasons explaining or supporting the accessibility statement; a digital reference link (e.g., uniform resource locator or hyperlink) or an access protocol through which the organization user can access the given better asset should the accessibility statement indicate that the given better asset can be accessed by the organization user; and/or the stewardship information (extracted in Step 322) associated with the given better asset should the accessibility statement alternatively indicate that the given better asset cannot be accessed by the organization user.

In one or many embodiment(s) disclosed herein, stewardship information may be integrated, as part of the better access remarks for a given better asset (if applicable—e.g., if the given better asset is deemed inaccessible), in order to provide the organization user with an opportunity to potentially gain access to the given better asset through communications with the steward(s) or owner(s) of the given better asset. The potential to gain access to the given better asset through this avenue, however, may be moot or disregarded in view of other, higher-tiered compliance policies such as those outlined by geographical restrictions, as well as national and/or international laws, regulations, and standards.

In Step 326, an asset availability, for each of one or more better assets (e.g., any existing structured and/or unstructured form(s) of information), is determined. In one or many embodiment(s) disclosed herein, the better asset(s) may map to asset catalog entry/entries represented by the strong adjacent node(s) (identified in Step 320). Further, the determination of asset availability for any given better asset may, for example, entail the submission of an asset availability query to an appropriate (i.e., internal or external) data source identified in the asset metadata describing the given better asset. Any asset availability query may include or specify an asset identifier (also found in the asset metadata) that uniquely identifies the given better asset. Moreover, in response to any asset availability query, a corresponding asset availability reply may be received, which may include or specify an asset availability state indicating whether the given better asset is available (e.g., obtainable, usable, or reachable) or unavailable (e.g., unobtainable, unusable, or unreachable). Thereafter, the returned asset availability state(s) for the better asset(s), respectively, may be used to produce better availability remarks concerning the better asset(s). Any better availability remarks may refer to information expressing whether the better asset(s) is/are available or unavailable at/on one or more data sources that the better asset(s) currently reside, or at one time, had resided.

Turning to FIG. 3C, in Step 328, a better search query result is created. In one or many embodiment(s) disclosed herein, the better search query result may include or specify a manifest of the better asset(s) mapped to asset catalog entry/entries represented by the strong adjacent node(s) (identified in Step 320), the better access remarks (produced in Step 324), and the better availability remarks (produced in Step 326).

In Step 330, a complete search query result is produced. In one or many embodiment(s) disclosed herein, the complete search query result may include or specify the original search query result (created in Step 318) and the better search query result (created in Step 328).

In Step 332, the complete search query result (produced in Step 330) is provided in response to the search query (received in Step 300). Particularly, in one or many embodiment(s) disclosed herein, the complete search query result may be provided to the organization user who had submitted the search query.

Figure 4:
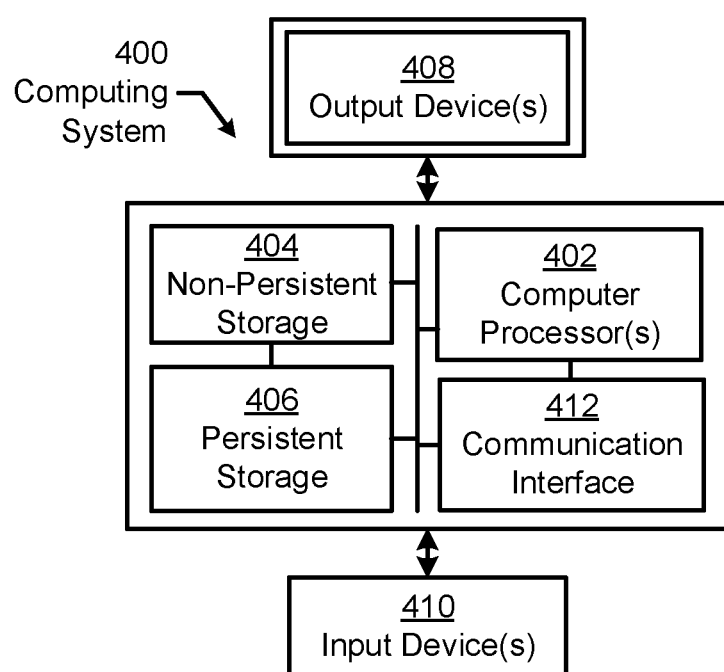
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

FIGS. 5A-5L show an example scenario in accordance with one or more embodiments disclosed herein. The example scenario, illustrated through FIGS. 5A-5L and described below, is explanatory purposes only and not intended to limit the scope disclosed herein.

Hereinafter, consider the following example scenario whereby an organization user, identified as Bill, seeks to obtain any asset(s) (e.g., any existing structured and/or unstructured form(s) of information) respective to the artificial intelligence (AI) space for research purposes. To that end, Bill relies on the disclosed capability of metadata-based query rewriting by the insight service to fulfill their research goals. Interactions amongst various actors—e.g., a Client Device (500) operated by Bill, the Insight Service (502), and two separate data sources (i.e., Data Source A (504A) and Data Source B (504B))—are illustrated in conjunction with components shown across FIGS. 23A-23K and described (in an itemized manner) below. Said interactions, as well as processes performed on/by any particular actor may follow embodiments disclosed herein pertaining to metadata-based query rewriting as applied to the circumstances of the example scenario.

Figure 5A:
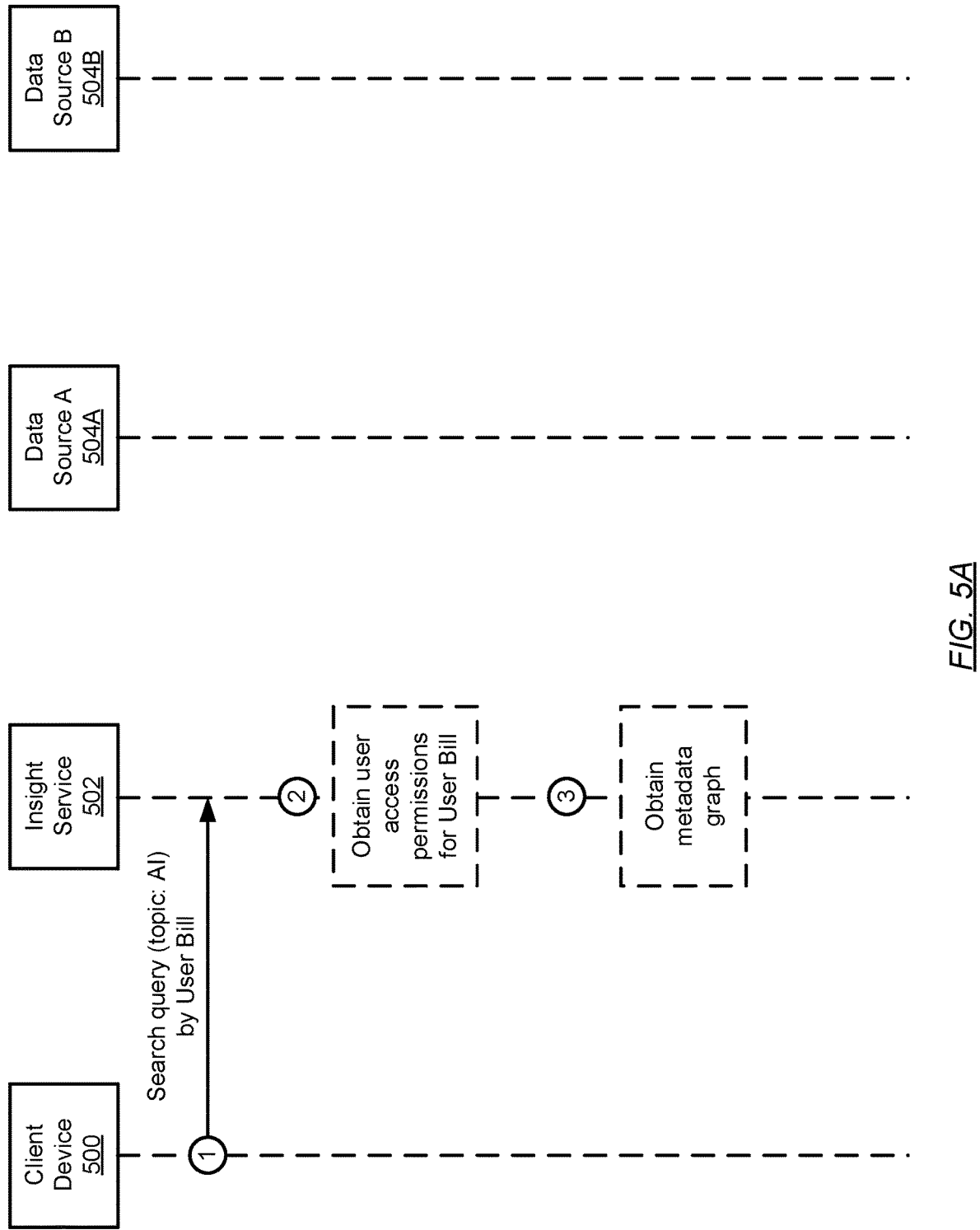
Figure 5B:
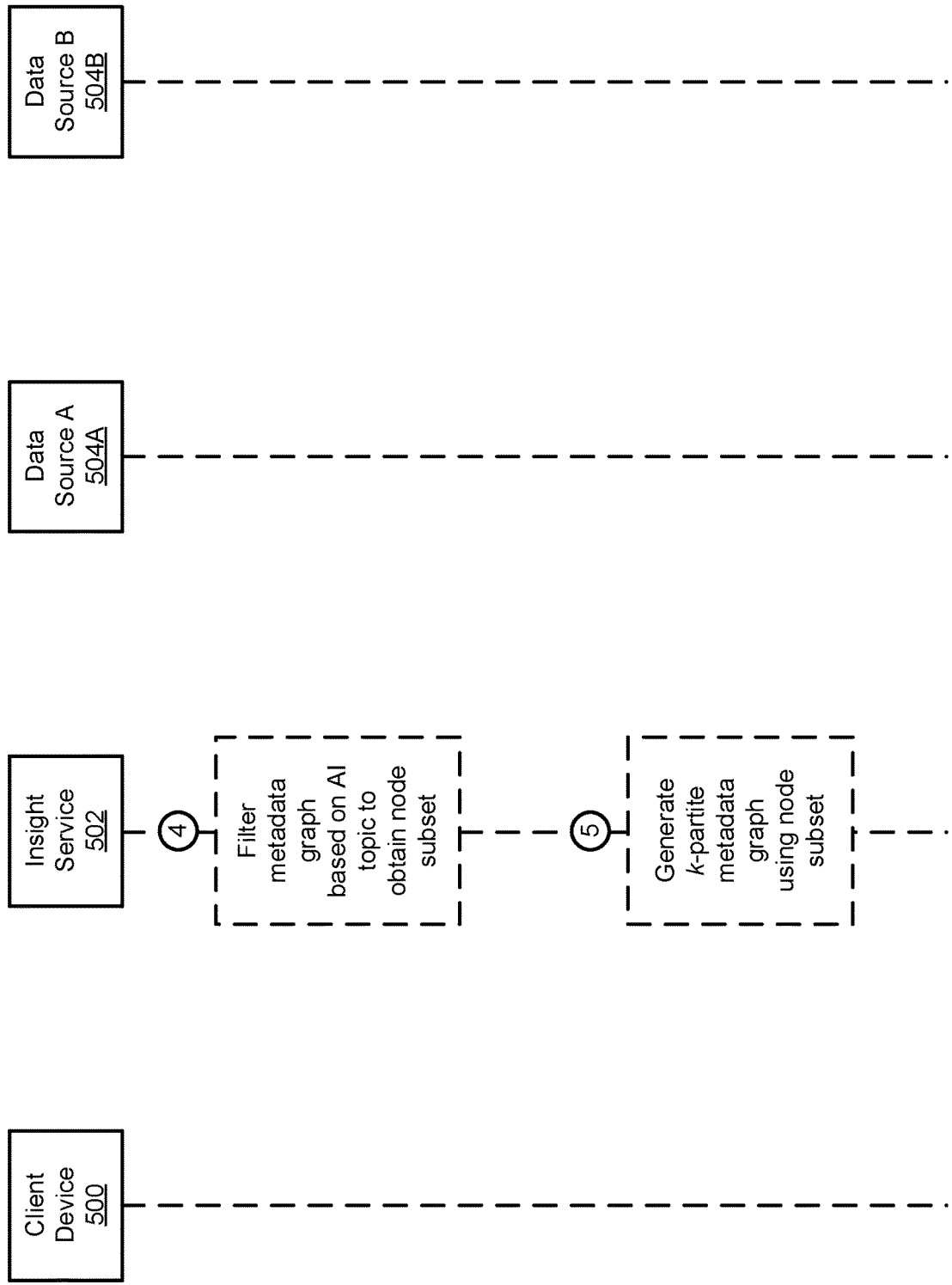
Figure 5C:
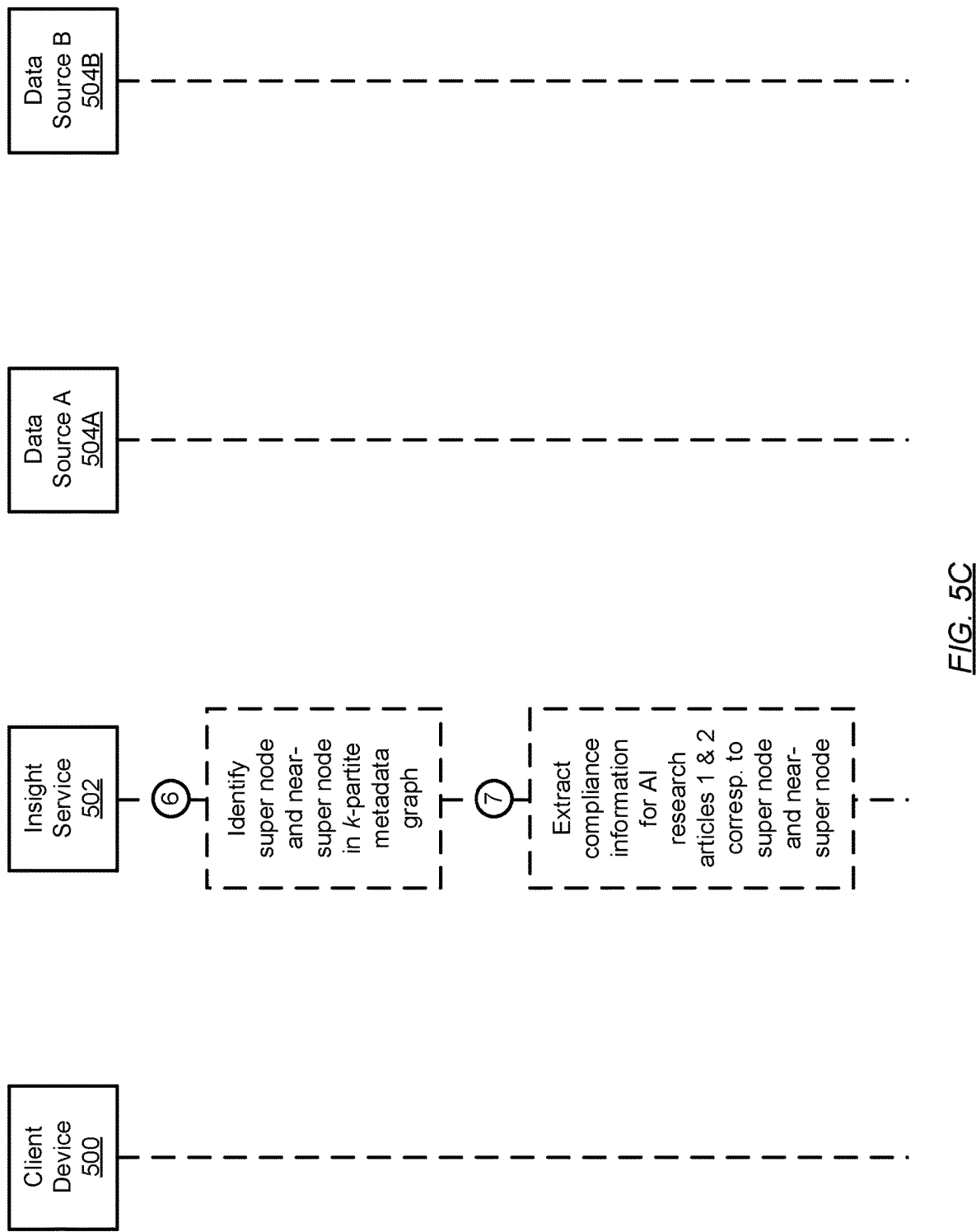
Figure 5D:
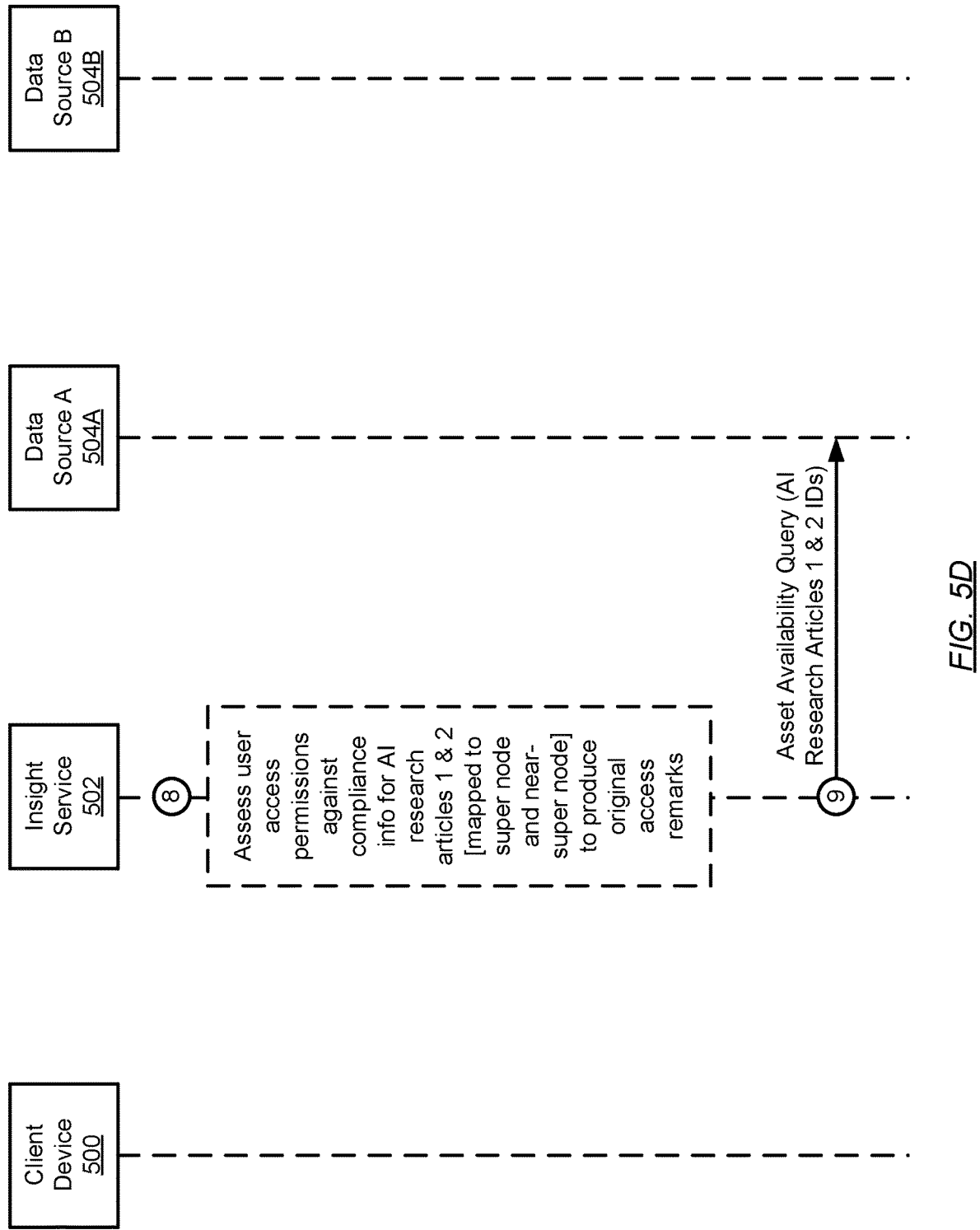

Turning to FIG. 5A:
1. User Bill, operating the Client Device (500), submits a search query to the Insight Service (502), where the search query specifies AI as a search topic
2. The Insight Service (502) obtains a user profile for User Bill, where the user profile includes user access permissions associated with User Bill
3. The Insight Service (502) further obtains a metadata graph representative of an asset catalog Turning to FIG. 5B:
4. Based on the search topic of AI, the Insight Service (502) filters the metadata graph to identify a node subset of a set of nodes, at least in part, forming the metadata graph, where the node subset includes one or more nodes corresponding to asset catalog entry/entries each specifying asset metadata (or at least a portion thereof) matching the search topic of AI
5. The Insight Service (502) generates a k-partite (i.e., uni-partite) metadata graph using the node subset Turning to FIG. 5C:
6. The Insight Service (502) identifies a super node and a near-super node in/of the k-partite metadata graph
7. The Insight Service (502) extracts a portion of asset metadata from asset catalog entries corresponding to the super node and near-super node, where the portion of asset metadata includes stewardship information and compliance information associated with original assets (e.g., any existing forms of structured and/or unstructured information) to which the extracted portion of asset metadata belongs Turning to FIG. 5D:
8. The Insight Service (502) assesses the user access permissions (associated with User Bill) against the compliance information for the original assets (e.g., AI research articles 1 & 2) mapped respectively to the super node and the near-super node, where the assessment leads to the production of original access remarks (e.g., AI research articles 1 & 2 are both deemed accessible to/by User Bill) concerning the original assets
9. To ascertain an asset availability for AI research articles 1 & 2, the Insight Service (502) submits an asset availability query to Data Source A (504A) which is identified as the host of AI research articles 1 & 2 amongst the asset metadata thereof, where the asset availability query includes unique asset identifiers (AI research articles 1 & 2 IDs) associated with AI research articles 1 & 2

Figure 5E:
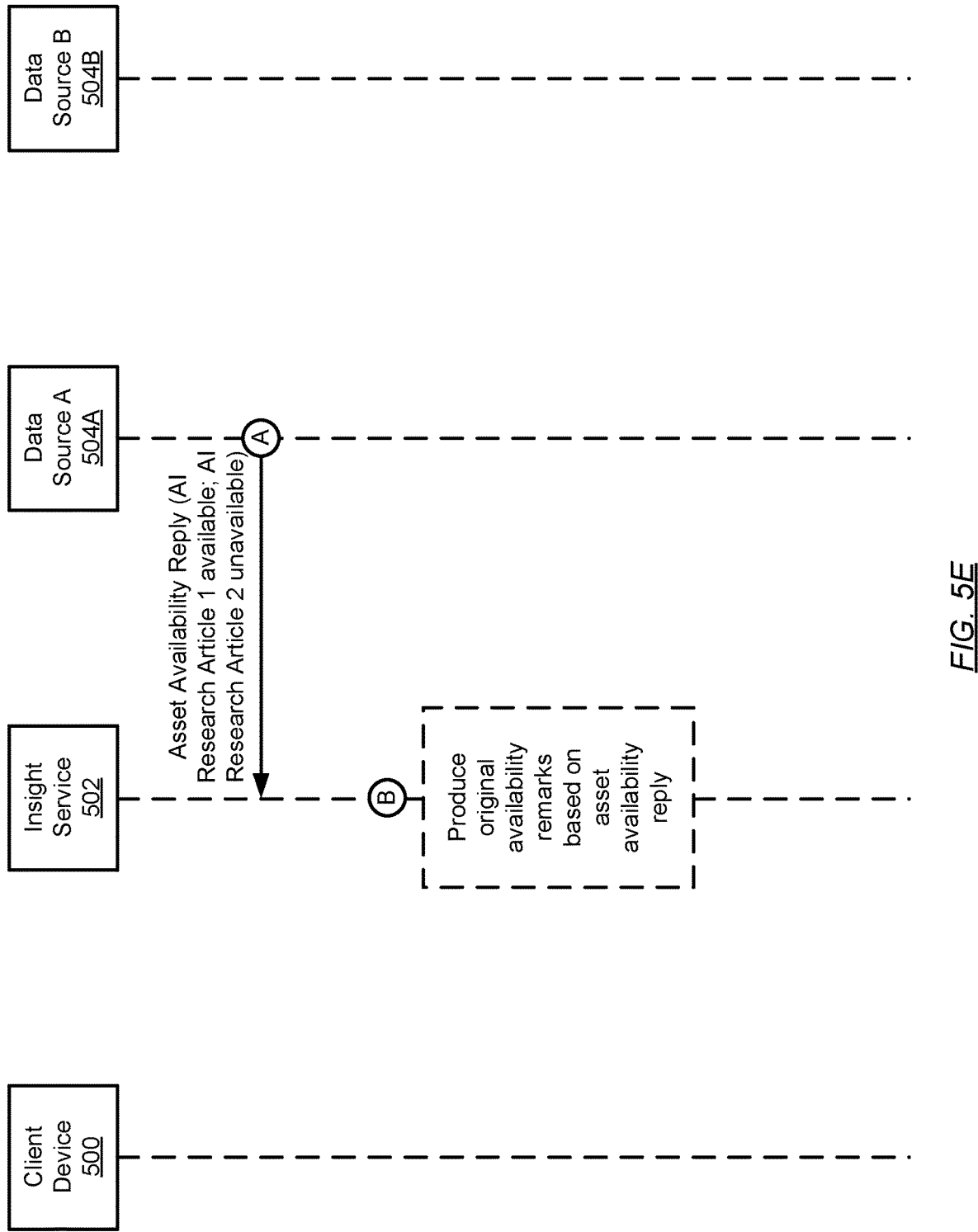
Figure 5F:
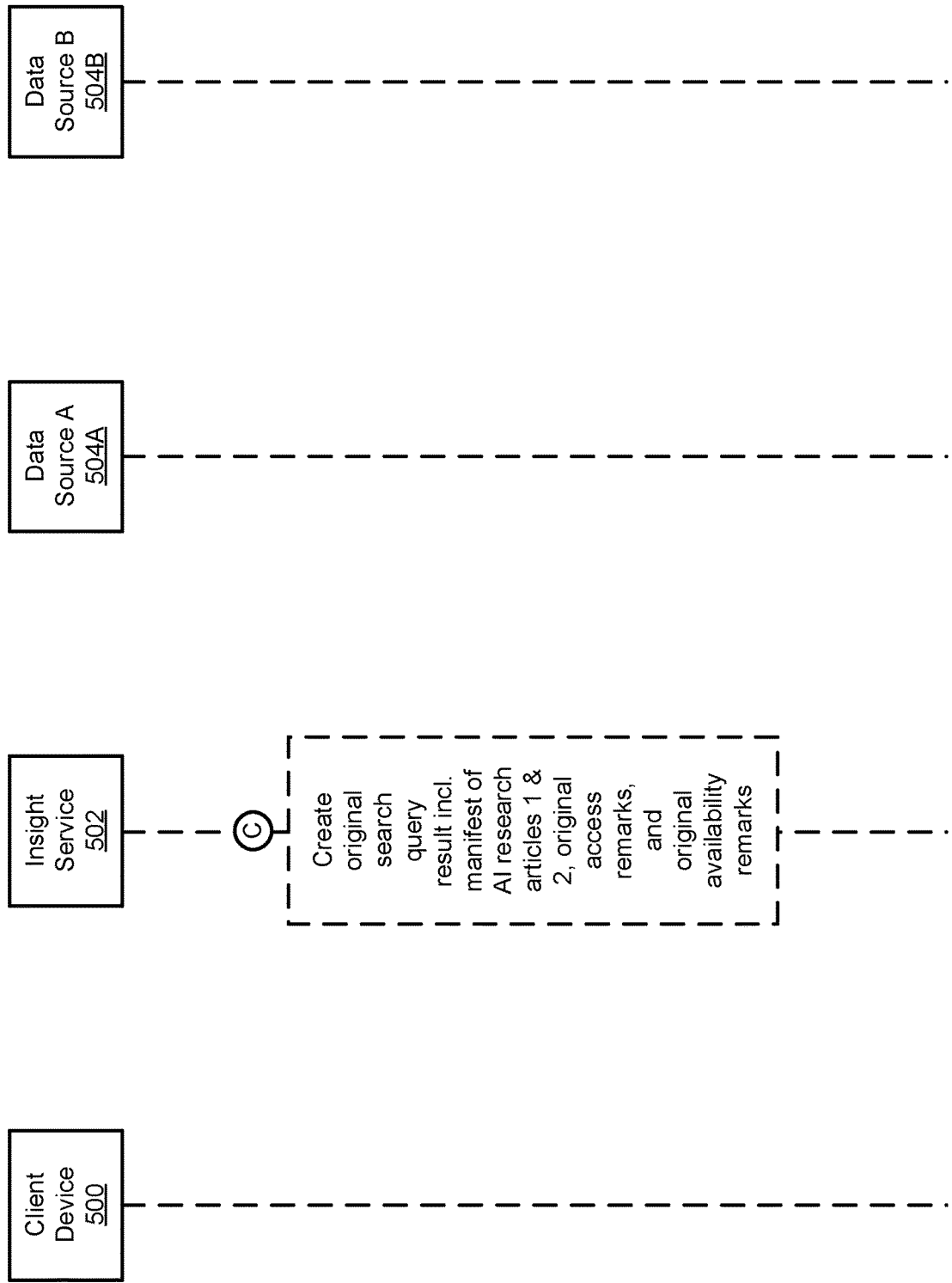
Figure 5G:
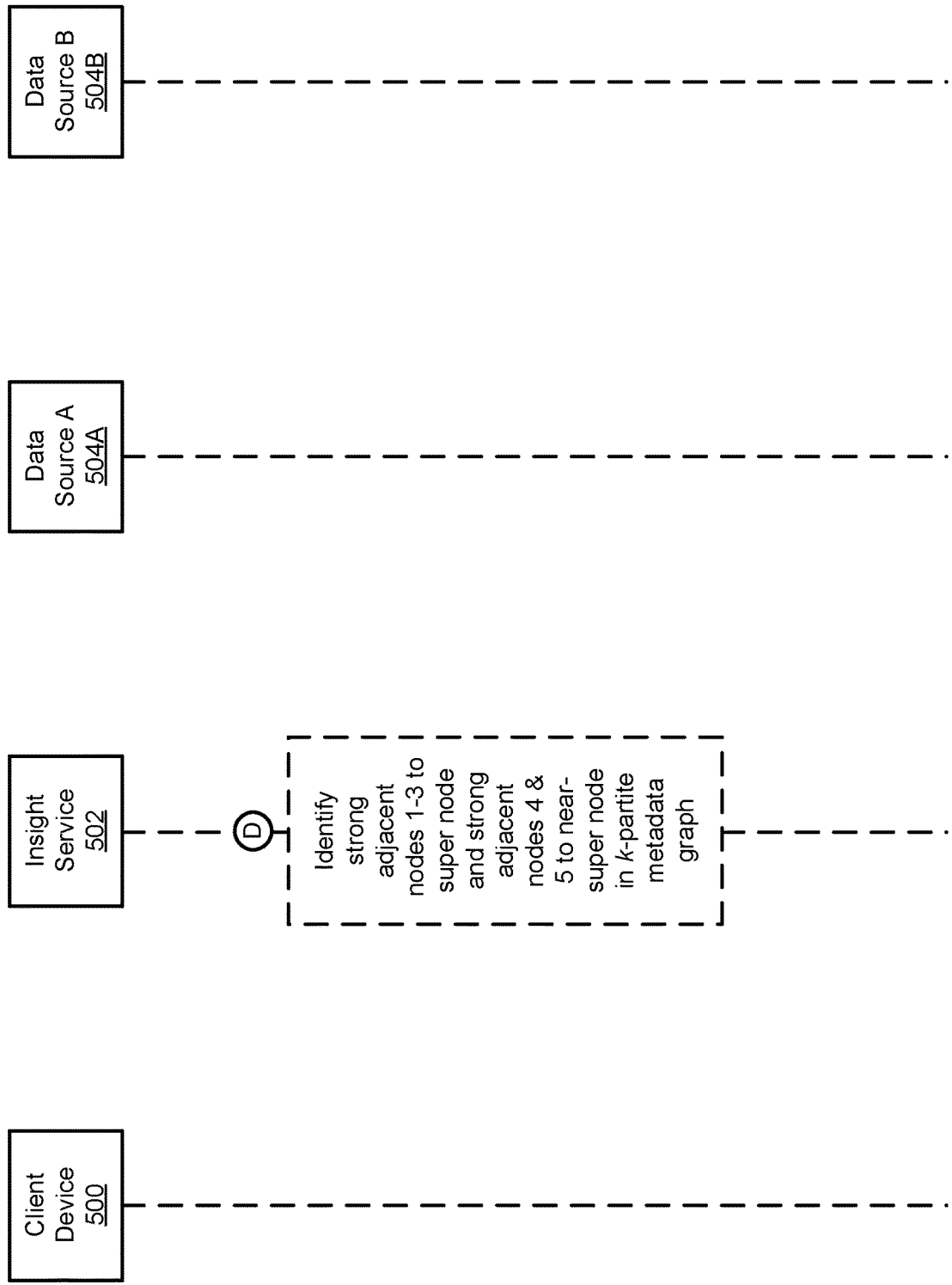
Figure 5I:
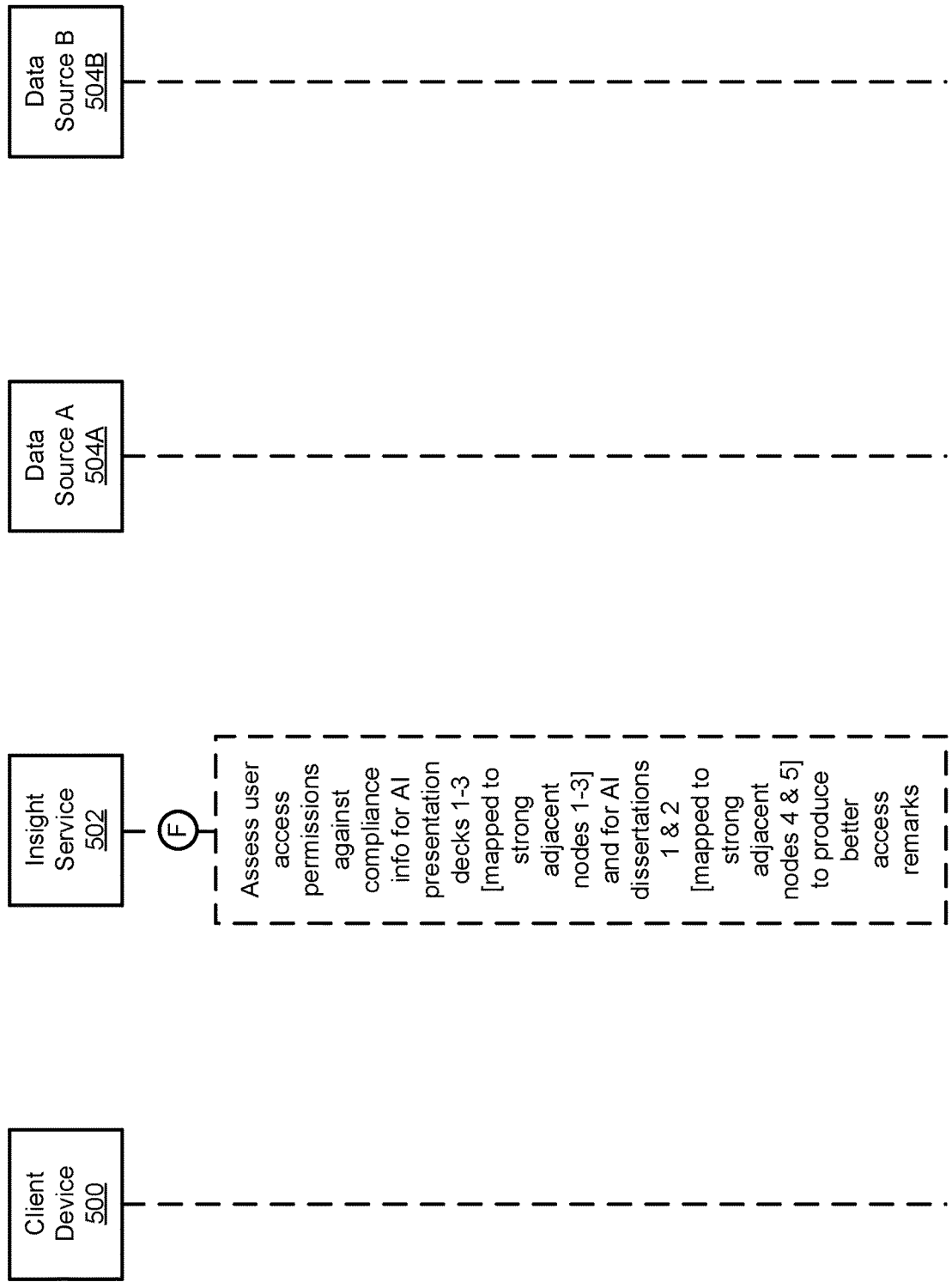
Figure 5J:
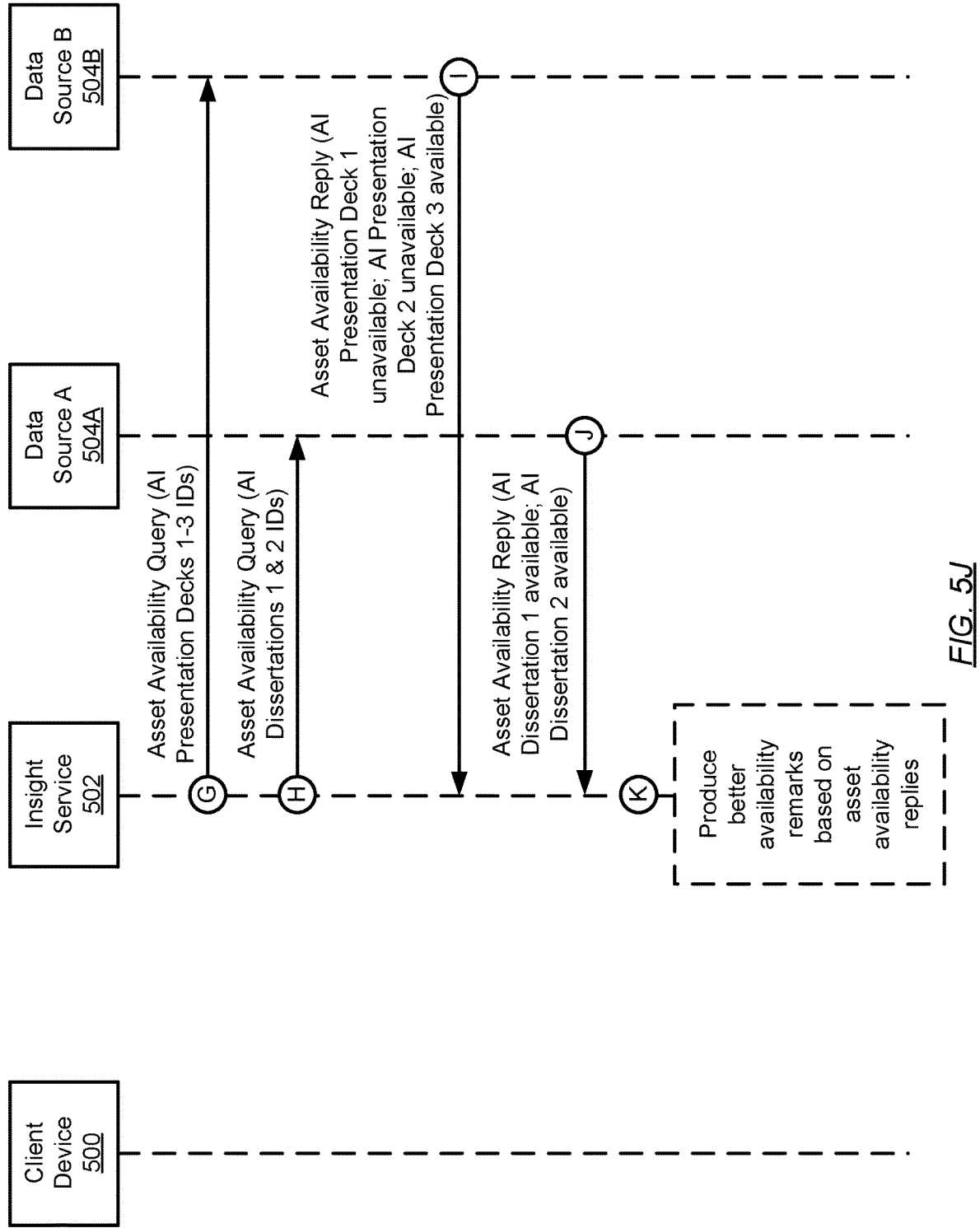
Figure 5K:
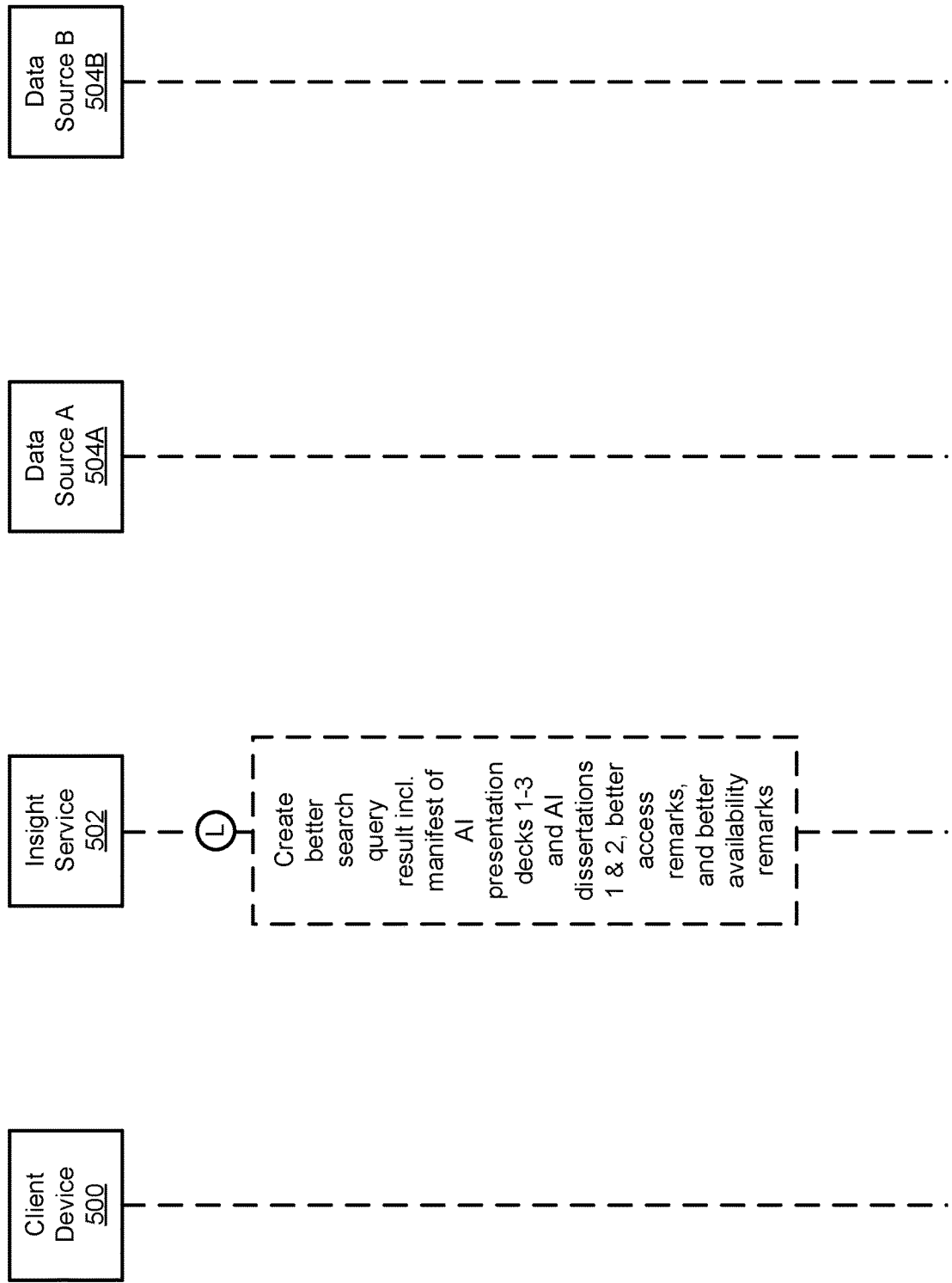
Figure 5L:
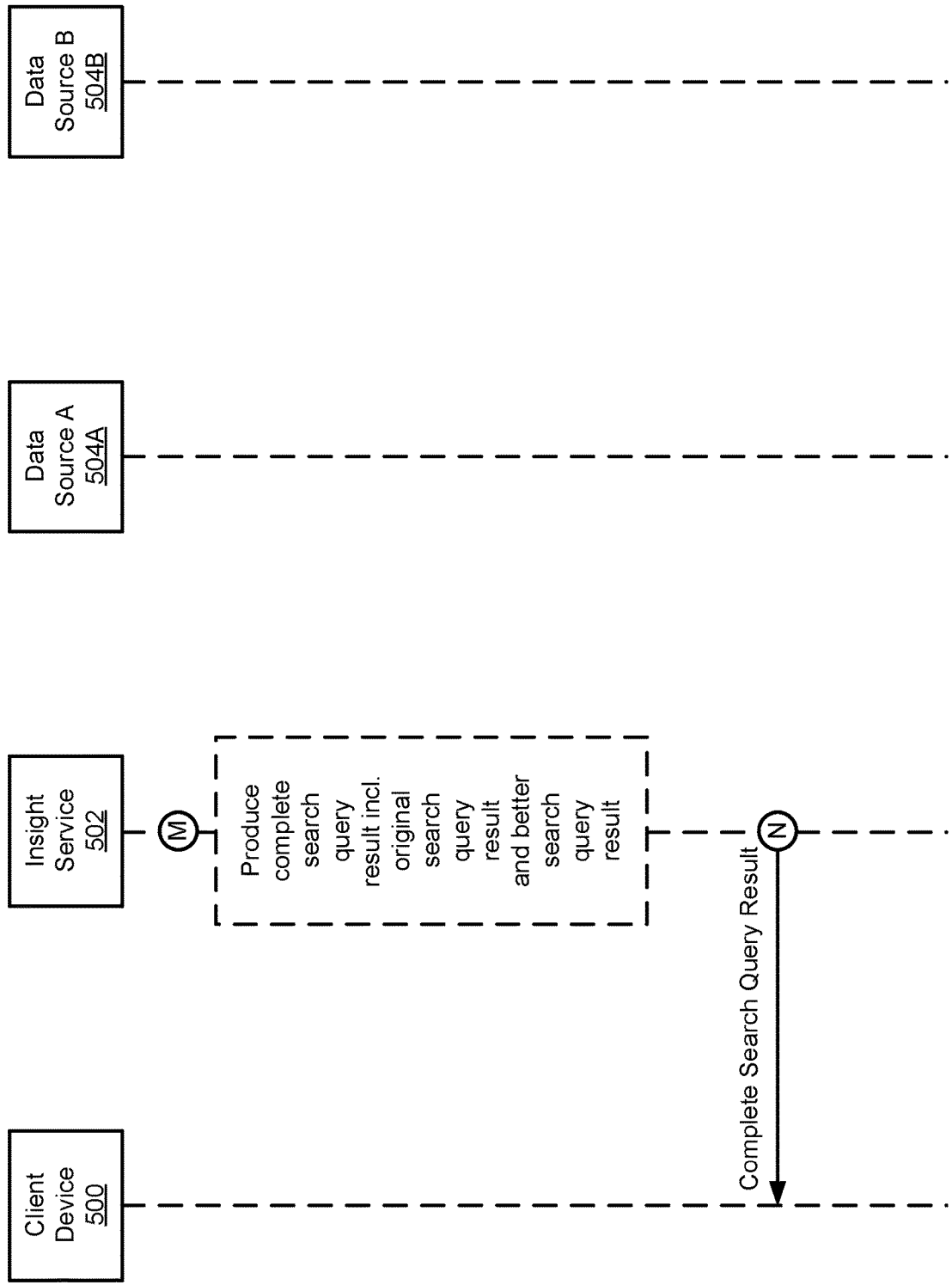

Turning to FIG. 5E:
A. In response to the submitted asset availability query regarding AI research articles 1 & 2, Data Source A (504A) returns an asset availability reply to the Insight Service (502), where the asset availability reply specifies asset availability states indicating that AI research article 1 is available while AI research article 2 is unavailable
B. The Insight Service (502) produces original availability remarks concerning AI research articles 1 & 2 based on the returned asset availability reply Turning to FIG. 5F:
C. The Insight Service (502) creates an original search query result including a manifest listing AI research articles 1 & 2, as well as the produced original access and original availability remarks Turning to FIG. 5G:
D. In the k-partite metadata graph, the Insight Service (502) further identifies three strong adjacent nodes (denoted as strong adjacent nodes 1-3) connected to the super node and two other strong adjacent nodes (denoted as strong adjacent nodes 4 & 5) connected to the near-super node Turning to FIG. 5H:
E. The Insight Service (502) extracts a portion of asset metadata from asset catalog entries corresponding to strong adjacent nodes 1-5, where the portion of asset metadata includes stewardship information and compliance information associated with better assets (e.g., any existing forms of structured and/or unstructured information) to which the extracted portion of asset metadata belongs Turning to FIG. 5I:
F. The Insight Service (502) assesses the user access permissions (associated with User Bill) against the compliance information for the better assets (e.g., AI presentation decks 1-3 and AI dissertations 1 & 2) mapped respectively to strong adjacent nodes 1-5, where the assessment leads to the production of better access remarks (e.g., AI presentation deck 2 & 3 and AI dissertation 1 are deemed accessible, whereas AI presentation deck 1 and AI dissertation 2 are deemed inaccessible, to/by User Bill; further, stewardship information associated with AI presentation deck 1 and AI dissertation 2 is incorporated) concerning the better assets Turning to FIG. 5J:
G. To ascertain an asset availability for AI presentation decks 1-3, the Insight Service (502) submits an asset availability query to Data Source B (504B) which is identified as the host of AI presentation decks 1-3 amongst the asset metadata thereof, where the asset availability query includes unique asset identifiers (AI presentation decks 1-3 IDs) associated with AI presentation decks 1-3

H. To ascertain an asset availability for AI dissertations 1 & 2, the Insight Service (502) submits an asset availability query to Data Source A (504A) which is identified as the host of AI dissertations 1 & 2 amongst the asset metadata thereof, where the asset availability query includes unique asset identifiers (AI dissertations 1 & 2 IDs) associated with AI dissertations 1 & 2

I. In response to the submitted asset availability query regarding AI presentation decks 1-3, Data Source B (504B) returns an asset availability reply to the Insight Service (502), where the asset availability reply specifies asset availability states indicating that AI presentation decks 1 & 2 are unavailable and AI presentation deck 3 is available J. In response to the submitted asset availability query regarding AI dissertations 1 & 2, Data Source A (504A) returns an asset availability reply to the Insight Service (502), where the asset availability reply specifies asset availability states indicating that AI dissertations 1 & 2 are available K. The Insight Service (502) produces better availability remarks concerning AI presentation decks 1-3 and AI dissertations 1 & 2 based on the returned asset availability replies Turning to FIG. 5K:

L. The Insight Service (502) creates an better search query result including a manifest listing AI presentation decks 1-3 and AI dissertations 1 & 2, as well as the produced better access and better availability remarks Turning to FIG. 5L:

M. The Insight Service (502) produces a complete search query result including the original search query result and the better search query result N. In response to the submitted search query, the Insight Service (502) provides the complete search query result to the Client Device (500) or, more specifically, to User Bill While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for processing search queries, the method comprising:
receiving, by an insight service and from an organization user of a client device, a search query comprising at least one search topic,
wherein the insight service and the client device are operably connected to each other over a combination of wired and wireless connections,
wherein the insight service is executing on a first computing device (CD) that comprises at least a first integrated circuitry (IC) that performs services for a second CD, wherein the client device is the second CD that comprises at least a second IC that provides second services to the organization user;
obtaining a metadata graph representative of an asset catalog, wherein the metadata graph comprises at least a set of node subsets and a set of nodes,
wherein the set of nodes comprises a first node set, a second node set, and a third node set,
wherein the first node set corresponds to a group of documents,
wherein the second node set corresponds to a group of authors,
wherein the third node set corresponds to a group of topics,
wherein the set of nodes are representative of asset catalog entries, wherein a first asset catalog entry of the asset catalog entries specifies at least one selected from a group consisting of a description of a first original asset, ownership information of the asset, version information of the asset, a topic associated with the asset, an identifier of the asset, and a compliance policy associated with the asset;
filtering, based on the at least one search topic, the metadata graph to identify at least one node subset of the set of node subsets;
generating a k-partite metadata graph using the at least one node subset; and
producing a complete search query result based on the k-partite metadata graph,
wherein producing the complete search query result based on the k-partite metadata graph comprises:
performing a first assessment of user access permissions against first compliance information associated with the first original asset, wherein the first assessment comprises at least determining:
a geographical location of the user that is exposed to geographical restrictions, and
a type of an organization associated with the user that grants usability of the first original asset.

2. The method of claim 1, wherein producing the complete search query result based on the k-partite metadata graph further comprises:
identifying a super node in the k-partite metadata graph;
extracting first asset metadata from the first asset catalog entry of the asset catalog,
wherein the first asset metadata describes the first original asset and the first asset catalog entry corresponds to the super node;
determining a first asset availability for the first original asset;
producing original availability remarks comprising the first asset availability;
creating an original search query result comprising a manifest of original assets and the original availability remarks, wherein the manifest of original assets lists the first original asset; and
producing the complete search query result comprising the original search query result.

3. The method of claim 2, wherein the super node is representative of a node in the k-partite metadata graph that is an endpoint for a number of edges, wherein the number of edges at least satisfies a threshold number of edges.

4. The method of claim 2, wherein producing the complete search query result based on the k-partite metadata graph further comprises:
identifying a near-super node in the k-partite metadata graph;
extracting second asset metadata from a second asset catalog entry of the asset catalog,
wherein the second asset metadata describes a second original asset and the second asset catalog entry corresponds to the near-super node;
determining a second asset availability for the second original asset;

amending the original availability remarks to further comprise the second asset availability; and amending the manifest of original assets to further list the second original asset.

5. The method of claim 4, wherein the near-super node is representative of a node in the k-partite metadata graph that is an endpoint for a number of edges, wherein the number of edges at least satisfies a first threshold number of edges and is less than a second threshold number of edges, wherein the second threshold number of edges serves as a criterion for identifying the super node.

6. The method of claim 4, wherein producing the complete search query result based on the k-partite metadata graph further comprises:

identifying, in the k-partite metadata graph, a strong adjacent node connected to one selected from a group of nodes comprising the super node and the near-super node;

extracting third asset metadata from a third asset catalog entry of the asset catalog,
wherein the third asset metadata describes a better asset and the third asset catalog entry corresponds to the strong adjacent node;

determining a third asset availability for the better asset;

producing better availability remarks comprising the third asset availability;

creating a better search query result comprising a manifest of better assets and the better availability remarks, wherein the manifest of better assets lists the better asset; and amending the complete search query result to further comprise the better search query result.

7. The method of claim 6, wherein the strong adjacent node is representative of a node in the k-partite metadata graph that connects to the one selected from the group of nodes via an edge representative of a strong relationship there-between, wherein the strong relationship is quantified by an edge weight associated with the edge that satisfies an edge weight threshold.

8. The method of claim 6, wherein the better search query result exhibits at least one selected from a group of enhancements comprising an increased recall and an increased precision, over the original search query result.

9. The method of claim 6, the method further comprising:
prior to obtaining the metadata graph:
obtaining a user profile for the organization user, wherein the search query originates from the organization user and the user profile comprises user access permissions associated with the organization user; and
prior to determining the first asset availability and the second asset availability:
performing the first assessment;
performing a second assessment of the user access permissions against second compliance information associated with the second original asset; and
producing original access remarks based on the first assessment and the second assessment, wherein the original search query result further comprises the original access remarks.

10. The method of claim 9, wherein the first asset metadata comprises the first compliance information, and wherein the second asset metadata comprises the second compliance information.

11. The method of claim 9, the method further comprising:
after producing the complete search query result:
providing, in response to the search query, the complete search query result to the organization user.

12. The method of claim 9, the method further comprising:
prior to determining the third asset availability:
performing a third assessment of the user access permissions against third compliance information associated with the better asset; and
producing better access remarks based on the third assessment, wherein the better search query result further comprises the better access remarks.

13. A non-transitory computer readable medium (CRM) comprising computer readable program code, which when executed by a computer processor, enables the computer processor to perform a method for processing search queries, the method comprising:

receiving, by an insight service and from an organization user of a client device, a search query comprising at least one search topic,
wherein the insight service and the client device are operably connected to each other over a combination of wired and wireless connections,
wherein the insight service is executing on a first computing device (CD) that comprises at least a first integrated circuitry (IC) that performs services for a second CD, wherein the client device is the second CD that comprises at least a second IC that provides second services to the organization user;

obtaining a metadata graph representative of an asset catalog, wherein the metadata graph comprises at least a set of node subsets and a set of nodes,
wherein the set of nodes comprises a first node set, a second node set, and a third node set,
wherein the first node set corresponds to a group of documents,
wherein the second node set corresponds to a group of authors,
wherein the third node set corresponds to a group of topics,
wherein the set of nodes are representative of asset catalog entries, wherein a first asset catalog entry of the asset catalog entries specifies at least one selected from a group consisting of a description of a first original asset, ownership information of the asset, version information of the asset, a topic associated with the asset, an identifier of the asset, and a compliance policy associated with the asset;

filtering, based on the at least one search topic, the metadata graph to identify at least one node subset of the set of node subsets;

generating a k-partite metadata graph using the at least one node subset; and producing a complete search query result based on the k-partite metadata graph, wherein producing the complete search query result based on the k-partite metadata graph comprises:
performing a first assessment of user access permissions against first compliance information associated with the first original asset, wherein the first assessment comprises at least determining:
a geographical location of the user that is exposed to geographical restrictions, and
a type of an organization associated with the user that grants usability of the first original asset.

14. The non-transitory CRM of claim 13, wherein producing the complete search query result based on the k-partite metadata graph further comprises:
identifying a super node in the k-partite metadata graph;
extracting first asset metadata from the first asset catalog entry of the asset catalog,
wherein the first asset metadata describes the first original asset and the first asset catalog entry corresponds to the super node;
determining a first asset availability for the first original asset;
producing original availability remarks comprising the first asset availability;
creating an original search query result comprising a manifest of original assets and the original availability remarks, wherein the manifest of original assets lists the first original asset; and
producing the complete search query result comprising the original search query result.

15. The non-transitory CRM of claim 14, wherein producing the complete search query result based on the k-partite metadata graph further comprises:
identifying a near-super node in the k-partite metadata graph;
extracting second asset metadata from a second asset catalog entry of the asset catalog,
wherein the second asset metadata describes a second original asset and the second asset catalog entry corresponds to the near-super node;
determining a second asset availability for the second original asset;
amending the original availability remarks to further comprise the second asset availability; and
amending the manifest of original assets to further list the second original asset.

16. The non-transitory CRM of claim 15, wherein producing the complete search query result based on the k-partite metadata graph further comprises:
identifying, in the k-partite metadata graph, a strong adjacent node connected to one selected from a group of nodes comprising the super node and the near-super node;
extracting third asset metadata from a third asset catalog entry of the asset catalog,
wherein the third asset metadata describes a better asset and the third asset catalog entry corresponds to the strong adjacent node;
determining a third asset availability for the better asset;
producing better availability remarks comprising the third asset availability;
creating a better search query result comprising a manifest of better assets and the better availability remarks, wherein the manifest of better assets lists the better asset; and
amending the complete search query result to further comprise the better search query result.

17. The non-transitory CRM of claim 16, the method further comprising:
prior to obtaining the metadata graph:
obtaining a user profile for the organization user, wherein the search query originates from the organization user and the user profile comprises user access permissions associated with the organization user; and
prior to determining the first asset availability and the second asset availability:
performing the first assessment;
performing a second assessment of the user access permissions against second compliance information associated with the second original asset; and
producing original access remarks based on the first assessment and the second assessment, wherein the original search query result further comprises the original access remarks.

18. The non-transitory CRM of claim 17, the method further comprising:
after producing the complete search query result:
providing, in response to the search query, the complete search query result to the organization user.

19. The non-transitory CRM of claim 17, the method further comprising:
prior to determining the third asset availability:
performing a third assessment of the user access permissions against third compliance information associated with the better asset; and
producing better access remarks based on the third assessment, wherein the better search query result further comprises the better access remarks.

20. A system, the system comprising:
a client device; and
an insight service, wherein the insight service and the client device are operably connected to each other over a combination of wired and wireless connections,
wherein the insight service is executing on a first computing device (CD) that comprises at least a first integrated circuitry (IC) that performs services for a second CD, wherein the client device is the second CD that comprises at least a second IC that provides second services to the organization user,
wherein the insight service comprises a computer processor configured to perform a method for processing search queries, the method comprising:
receiving, from an organization user of the client device, a search query comprising at least one search topic;
obtaining a metadata graph representative of an asset catalog, wherein the metadata graph comprises at least a set of node subsets and a set of nodes,
wherein the set of nodes comprises a first node set, a second node set, and a third node set,
wherein the first node set corresponds to a group of documents,
wherein the second node set corresponds to a group of authors,
wherein the third node set corresponds to a group of topics,
wherein the set of nodes are representative of asset catalog entries, wherein a first asset catalog entry of the asset catalog entries specifies at least one selected from a group consisting of a description of a first original asset, ownership information of the asset, version information of the asset, a topic associated with the asset, an identifier of the asset, and a compliance policy associated with the asset;
filtering, based on the at least one search topic, the metadata graph to identify at least one node subset of the set of node subsets;
generating a k-partite metadata graph using the at least one node subset; and producing a complete search query result based on the k-partite metadata graph, wherein producing the complete search query result based on the k-partite metadata graph comprises:

performing a first assessment of user access permissions against first compliance information associated with the first original asset, wherein the first assessment comprises at least determining:

a geographical location of the user that is exposed to geographical restrictions, and a type of an organization associated with the user that grants usability of the first original asset.

\* \* \* \* \*